United States Patent
Solari et al.

(10) Patent No.: US 12,432,258 B2
(45) Date of Patent: Sep. 30, 2025

(54) DIGITAL TRUST BROKER AND END TO END TRUST ASSURANCE IN MULTI-DOMAIN, MULTI-OPERATOR AND CLOUD NETWORKS FOR HIGH SECURITY ENVIRONMENTS

(71) Applicant: SecureG, Sterling, VA (US)

(72) Inventors: Carlos Solari, Sterling, VA (US); Surya Kumar Kovvali, Carlisle, MA (US); Kevin Riley, Amesbury, MA (US)

(73) Assignee: SecureG, Sterling, VA (US)

( * ) Notice: Subject to any disclaimer, the term of this patent is extended or adjusted under 35 U.S.C. 154(b) by 241 days.

(21) Appl. No.: 18/204,615

(22) Filed: Jun. 1, 2023

(65) Prior Publication Data

US 2023/0328112 A1 Oct. 12, 2023

Related U.S. Application Data

(63) Continuation of application No. 17/679,672, filed on Feb. 24, 2022, now Pat. No. 11,711,401.

(Continued)

(51) Int. Cl.
*H04L 9/40* (2022.01)
*H04L 9/32* (2006.01)
*H04W 12/06* (2021.01)

(52) U.S. Cl.
CPC .......... *H04L 63/205* (2013.01); *H04L 9/3263* (2013.01); *H04L 63/08* (2013.01); *H04W 12/06* (2013.01)

(58) Field of Classification Search
CPC . H04L 9/3263; H04L 63/205; H04L 63/0823; H04L 63/08; H04L 2209/80; H04W 12/06; H04W 12/069

(Continued)

(56) References Cited

U.S. PATENT DOCUMENTS 11,240,043 B1 * 2/2022 Leblang ................ H04L 67/025
11,418,955 B2 8/2022 Marinho et al.
(Continued)

FOREIGN PATENT DOCUMENTS

WO 2017/200978 A1 11/2017
WO 2019/197883 A1 10/2019

OTHER PUBLICATIONS

International Search Report and Written Opinion mailed Sep. 28, 2021 in co-pending PCT application No. PCT/US2021/032643.
(Continued)

*Primary Examiner* — Benjamin A Kaplan
(74) *Attorney, Agent, or Firm* — Nields, Lemack & Frame, LLC

(57) ABSTRACT

System and methods of brokering trust across multiple Authentication and Authorization methods in a multi-domain, multi-operator, private and public cloud networks are identified. A Digital Trust Broker (DTB) is disclosed that brokers trust between infrastructure authentication methods that use digital certificates (PKI) and operator/enterprise Authentication/Authorization methods through interaction with multiple operator/service provider control and management platforms. The Digital Trust Broker interacts with vendor management and security platforms for associating device manufacturing, assembly, supply-chain, and logistics attributes for assuring trust of compute, network, storage and other system components that a high security enterprise or service provider acquires and installs in their networks. Additionally, methods of generating enhanced certificates for secure network slices and other Cloud and SDN hosted virtual network functions as trust assured services are also disclosed.

15 Claims, 9 Drawing Sheets

Related U.S. Application Data

(60) Provisional application No. 63/207,419, filed on Mar. 1, 2021.

(58) Field of Classification Search
USPC .............................................................. 726/3
See application file for complete search history.

(56) References Cited

U.S. PATENT DOCUMENTS

| | | | |
|---|---|---|---|
| 11,418,961 B2* | 8/2022 | Ben Henda | ........... H04W 12/60 |
| 11,711,401 B2 | 7/2023 | Solari et al. | |
| 2007/0005801 A1 | 1/2007 | Kumar et al. | |
| 2009/0240941 A1 | 9/2009 | Lee et al. | |
| 2009/0319781 A1 | 12/2009 | Byrum et al. | |
| 2010/0313011 A1 | 12/2010 | Laffey | |
| 2012/0317569 A1 | 12/2012 | Payne, Jr. et al. | |
| 2013/0182722 A1 | 7/2013 | Vishveswaraiah et al. | |
| 2014/0283031 A1 | 9/2014 | Eksten et al. | |
| 2014/0301192 A1 | 10/2014 | Lee et al. | |
| 2015/0063166 A1 | 3/2015 | Sif et al. | |
| 2015/0156191 A1 | 6/2015 | Schmidt et al. | |
| 2016/0080502 A1 | 3/2016 | Yadav et al. | |
| 2016/0330749 A1 | 11/2016 | Mehrabanzad et al. | |
| 2017/0079059 A1 | 3/2017 | Li et al. | |
| 2017/0164212 A1 | 6/2017 | Opsenica et al. | |
| 2017/0357818 A1 | 12/2017 | Sheehan et al. | |
| 2018/0097774 A1 | 4/2018 | Ore et al. | |
| 2019/0109714 A1 | 4/2019 | Clark et al. | |
| 2019/0109821 A1 | 4/2019 | Clark et al. | |
| 2019/0141536 A1 | 5/2019 | Bachmutsky et al. | |
| 2019/0166506 A1 | 5/2019 | Ashrafi | |
| 2019/0386969 A1 | 12/2019 | Verzun et al. | |
| 2019/0387401 A1 | 12/2019 | Liao et al. | |
| 2021/0144517 A1 | 5/2021 | Guim Bernat et al. | |
| 2021/0360401 A1 | 11/2021 | Marinho et al. | |
| 2022/0141192 A1 | 5/2022 | Silveira et al. | |
| 2022/0207127 A1* | 6/2022 | Young | ................... H04L 9/3263 |
| 2022/0279023 A1 | 9/2022 | Solari et al. | |

OTHER PUBLICATIONS

International Search Report and Written Opinion mailed Jun. 6, 2022 in co-pending PCT application No. PCT/uS2022/017669.

Kotulski et al., "On end-to-end approach for slice isolation in 5G networks. Fundamental challenges.", Federated conference on computer science and information systems (FedCSIS). IEEE, Sep. 6, 2017, <https:I/ieeexplore.ieee.org/abstracVdocument/8104638>.

Marek. "The security conundrum of network slicing.", Light Reading., Apr. 13, 2020, <https://www.lightreading.com/security/the-security-conundrum-of-network-slicing/d/d-id/758814>.

Slamnik-Kriještorac et al., "Sharing Distributed and Heterogeneous Resources toward End-to-End 5G Networks: A Comprehensive Survey and a Taxonomy" IEEE Communications Surveys & Tutorials, 2020.

Office action mailed May 30, 2023 in co-pending U.S. Appl. No. 17/859,610.

Office Action mailed Dec. 22, 2023 in co-pending U.S. Appl. No. 17/859,610.

* cited by examiner

EXAMPLE METADATA EXTENSIONS FOR SLICE CERTIFICATE

THE SLICE CERTIFICATE MAY INCLUDE:
- SLICE SECURITY LEVEL
- FUNCTION TYPE = L2 SWITCH/BRIDGE
  - ALLOWED OEM MANUFACTURERS
  - ALLOWED OEM MODELS
  - ALLOWED MFG LOCATIONS
  - ALLOWED VENDORS
  - ALLOWED MODEL_VERSION
  - ALLOWED ASSEMBLY VENDORS
  - ALLOWED ASSEMBLY LOCATION
  - VLAN
  - FLOODING CONTROL
  - PACKET FILTERS
  - VXLAN
  - SPANNING TREE
  - INTERFACE MIRRORING
- FUNCTION TYPE = L3 ROUTING
  - ROUTING PROTOCOLS
  - SOURCE ROUTING
  - PACKET FILTERS
- ...

THE STRUCTURE OF AN X.509 V3:
- CERTIFICATE
  - VERSION NUMBER
  - SERIAL NUMBER
  - SIGNATURE ALGORITHM ID
  - ISSUER NAME
  - VALIDITY PERIOD
    - NOT BEFORE
    - NOT AFTER
  - SUBJECT NAME
  - SUBJECT PUBLIC KEY INFO
    - PUBLIC KEY ALGORITHM
    - SUBJECT PUBLIC KEY
  - ISSUER UNIQUE IDENTIFIER (OPTIONAL)
  - SUBJECT UNIQUE IDENTIFIER (OPTIONAL)
  - EXTENSIONS (OPTIONAL)
  - ...
- CERTIFICATE SIGNATURE ALGORITHM
- CERTIFICATE SIGNATURE

FIG. 8

DIGITAL TRUST BROKER AND END TO END TRUST ASSURANCE IN MULTI-DOMAIN, MULTI-OPERATOR AND CLOUD NETWORKS FOR HIGH SECURITY ENVIRONMENTS

This application is a continuation of U.S. patent application Ser. No. 17/679,672 filed Feb. 24, 2022, which claims priority of U.S. Provisional Patent Application Ser. No. 63/207,419 filed on Mar. 1, 2021, the disclosures of which are incorporated herein by reference in their entireties.

BACKGROUND

Enterprises such as financial institutions, the Department of Defense (DOD), Government departments, health care and others that manage and process highly sensitive data use proven, reliable and well-known systems from established trustworthy vendors in datacenters with physically secure perimeter locations. Their IT departments manage these datacenters with highly experienced personnel that are specially trained with their specific security policies. Establishing and procuring this equipment, as well as maintaining and upgrading these datacenters is becoming highly expensive. Network and datacenter virtualization paradigms, and the use of COTS (Common Off The Shelf) hardware, network, computing and storage virtualization that utilize the same hardware for multiple enterprisers/users is significantly reducing the hardware costs. Additionally, cloud computing and Software Defined Networks (SDNs) in which the physical network, computing and storage resources are procured and managed by small number of service providers (such as Amazon, Google, Microsoft, and others) and shared by many enterprises is significantly reducing the computing cost. With the exploding growth of Network Function Virtualization (NFV) and cloud computing, high security enterprises are increasingly migrating from perimeter secure datacenters to virtual datacenters that use COTS platforms and are shared by many enterprises. Also, with the advent of edge computing, many enterprises plan to reduce path latencies by opportunistically providing edge computing environments or locating virtual computing functions such as proxies, caching servers, storage servers, IOT gateways at network boundaries close to users or businesses that use the services. The shared use of resources significantly increases security vulnerabilities. While user sessions may be encrypted, these sessions terminate at the servers where the data is processed, and any security compromise of a website or a server or other components may affect several enterprises. Also, malware or other compromised software may capture and export encrypted session logs of highly sensitive data to bad actors that use enormous compute resources to break the security algorithm that a session uses. Additionally, the COTS hardware systems, and software modules used by the cloud/SDN or transit network providers may have embedded vulnerabilities, or may utilize unreliable or not adequately verified components that compromise security. A high security enterprise may require additional security, trust assurance and methods of verifying this trust before, during or after use. For example, the enterprise may need to ensure that the platform components are from established vendors that the enterprise trusts, and/or manufactured in certain countries or regions, are certain models and versions, and support security policies that the enterprise requires.

Enhanced X.509 certificates with extensions that include provenance and other meta data have previously been described along with methods of setting up Secure Network Slices (SNS) through the transit network for use by security enterprises, end users and their applications. In addition to assuring transit network path trust, and using path-aware transport networks, it is essential that the plurality of hardware and system components, the layers of software modules in the service provider datacenters, and the public and private clouds that provide macro and micro services are security and trust assured at each layer from the application layers that a security enterprise uses down to the physical element level. Additionally, in the paradigm shift to edge computing, many enterprises that deal with varying levels of sensitive data, are increasingly using edge services to significantly reduce round trips and response times. While the enterprise servers may be in traditional perimeter secure datacenters or in shared computing datacenters, the use of edge services via shared environments such as public/private clouds that use opportunistically created virtual servers, proxies, caches that are shared by multiple enterprises increases security vulnerabilities. For example, a distributed database service, such as Hadoop or Cloudera or an Oracle distributed server offered by a cloud service provider may offer edge services by opportunistically creating a virtual proxy, cache, storage at edge locations in their cloud. While user sessions to servers or proxies or other VNFs that provide services may be encrypted, the sessions terminate in servers or proxies while processing the data and shared environments increase security vulnerabilities. Therefore, it is essential that such physical/virtual entities that provide the services in the enterprise datacenter or cloud data centers or physical/virtual computing devices in the access/edge/core networks and the underlying physical/virtual platform components are trust assured according to the enterprise required security policies.

Zero Trust Architecture (ZTA) by NIST Publication, 800-207 suggests that while the computing paradigm moves from perimeter enterprise datacenters to non-perimeter secure environments, all the systems, virtual and physical components need to be security/trust verified according to the required security/trust policies at different granularities, for example, for each department access, for each service, for each user/application session, each data segment, data volume, number of records, and frequency (hourly, daily, new session). The present disclosure and U.S. Patent Publication 2021/0360401, the disclosure of which is incorporated by reference in its entirety, teach that trust assurance of each platform component includes verifying the provenance data of each linecard/chassis module, hierarchy of virtualization layers, applications in each linecard/chassis module, geo location of the platform in operation, validating configuration and security policies on each interface, linecard and other component so that sensitive data is not processed or forwarded outside of the expected paths. eDCs (PKI/X.509 Digital Certificates with metadata enhancements) in devices and the construction of Secure Network Slices (SNSs) to carry and process sensitive data has been described previously.

U.S. Patent Publication 2021/0360401 discloses the creation of trust assured path-aware Secure Network Slices where the slice traffic traverses only through physical/virtual network elements (NEs) that hold Enhanced X.509 Digital Certificates (eDCs) that include provenance and other metadata. The eDCs are virtual/physical device certificates that are created by Enhanced Certificate Authorities (eCAs) and onboarded to the compliant devices. Enhanced security infrastructure system components such as OSCP Server, OCSP Proxies and others assist in tracking, validating, revoking and other policies according to the PKI/X.509 specification.

However, there is a need to further expand this concept by trust assuring and validating the transit path NEs through interaction with transit operator Control and Management Platforms (CMPs) or Operational Support Systems (OSS) to determine provenance data, device attributes, configuration policies when the transit NEs may not have embedded eDCs.

SUMMARY

The Cloud/SDN/NFV environment that a high security enterprise uses may traverse a plurality of network and compute domains by multiple service providers with a plurality of Authentication and Authorization frameworks such as PKI, OAUTH2.0, and others. Authentication and trust assurance of plurality of service provider network segments as orchestrated by enhanced digital certificates (eDC), providing transit path visibility is one of the goals of the Digital Trust Broker (DTB) identified herein. The DTB interfaces with a plurality of service provider Policy and Operation Control Systems (PCFs) and Management platforms to assure security policies, analyze certificate flows (such as OCSP flows), determine high density use of specific certificates for opportunistic placement of security system components, identify anomalies via machine learning (ML) algorithms and initiate corrective actions.

When enterprises such as DOD, financial institutions and others that deal with highly classified data utilize flexible compute, network and storage resources from communication, cloud and virtual service providers for reducing infrastructure and maintenance costs, it is essential that for every virtual and physical transit element, every different hardware and software components that it uses, the identity of the OEMs, Chassis, Linecards, Assembly, and Systems Integrators are trust assured and methods of verifying trust is available to businesses and users that utilize the services. It is envisioned that large service providers such as CSPs (Communication Service Providers), Cloud Service Providers, Systems Integrators and others incorporate the methods identified herein at device and component procurement sites to verify the identity and trust, and generate enhanced Certificates for transit network, compute and storage virtual and physical elements.

According to one embodiment, a method of allowing an enterprise to create a Secure Network Slice, which is a multi-point secure network having a plurality of endpoints, within a multi-domain multi-provider network, is disclosed. The method comprises determining a plurality of access networks at each endpoint; interacting with an Orchestration and Management Platform (OMP) within each of the plurality of access networks to determine entry and exit points for each access network; identifying transit networks and cloud or SDN providers to be traversed to connect to the endpoints; using an OMP interface to ensure that each network device within each transit network and cloud or SDN providers comprises a set of required attributes; creating a set of trusted network segments and network equipment through the transit networks and cloud or SDN providers; and negotiating with the transit networks and cloud or SDN providers to create a Secure Network Slice. In some embodiments, the set of trusted network segments and network equipment attributes is provided to an operator of one of the access networks and the operator negotiates with the transit networks and cloud or SDN providers. In some embodiments, the enterprise negotiates with the transit networks and cloud or SDN providers. In some embodiments, the method comprises periodically revalidating the Secure Network Slice. In some embodiments, the required attributes are selected from the group consisting of function, vendor name, hardware model number, hardware version number, manufacturer Name, manufacturer Location, Region, Operating System vendor, Version number, Geo location, and device capabilities and features. In certain embodiments, the device capabilities and features are selected from the group consisting of packet filters, deep packet inspection and content-aware processing controls, mirroring, and packet flooding controls. In some embodiments, the required attributes are stored in an enhanced digital certificate (eDC).

According to another embodiment, a method of allowing an enterprise to create a trusted network in multiple security environments managed by enterprises, operator and service providers, wherein the network comprises a Secure Network Slice (SNS) and a second network that utilizes different authentication and authorization methods, is disclosed. The method comprises using a digital trust broker (DTB), which comprises one or more software applications; creating a DTB client application that communicates with the DTB; allowing a trusted device in the second network to authenticate devices in the second network using methods specific to the second network; and using the DTB to bridge trust between the SNS and the second network. In some embodiments, the methods specific to the second network are selected from the group consisting of IOT, EAP, CHAP, MFA, RADIUS, 802.1X, QR Codes, Bluetooth, and mobile wireless network protocols. In some embodiments, the second network comprises an IoT network comprising an IOT gateway and a plurality of IOT devices; and the IOT gateway authenticates the IOT devices using a method specific to IOT protocols. In some embodiments, the IOT devices and the IOT gateway communicate using a wireless network or wired network. In some embodiments, the wireless network comprises Bluetooth, WIFI, NFC, or 5G. In certain embodiments, the second network comprises a mobile wireless network comprising a User Data Management (UDM), a plurality of mobile devices and mobile applications, wherein the UDM authenticates the mobile devices using a method specific to 5G. In some embodiments, the mobile applications comprise applications that interact with the DTB for security and trust validation for connecting to the SNS.

According to another embodiment, network device comprising a plurality of components is disclosed. The network device comprises a Chassis Certificate that assures that all of the plurality of components are trust verified. In some embodiments, the plurality of components comprises hardware components and/or software components. In some embodiments, the Chassis Certificate is created in conjunction with a Certificate Authority (CA). In some embodiments, the network device comprises a Chassis Certificate Tracking Module, which comprises a software module that communicates with computing elements in the plurality of components to obtain a chassis configuration, and verifies the chassis configuration is unchanged after every power-up. In some embodiments, the Chassis Certificate includes information regarding a number of chassis slots, a number of linecards, type of each linecard, its vendor, model name, manufacturing location, expiration date, and certificate-id. In some embodiments, the plurality of components are disposed in a single cabinet or chassis; or are interconnected with external cables.

BRIEF DESCRIPTION OF THE DRAWINGS

For a better understanding of the present disclosure, reference is made to the accompanying drawings, in which like elements are referenced with like numerals, and in which:

FIG. 8 shows an example Slice Certificate that lists transit device types, and the corresponding provenance and other security policy metadata.

DETAILED DESCRIPTION

Figure 1:
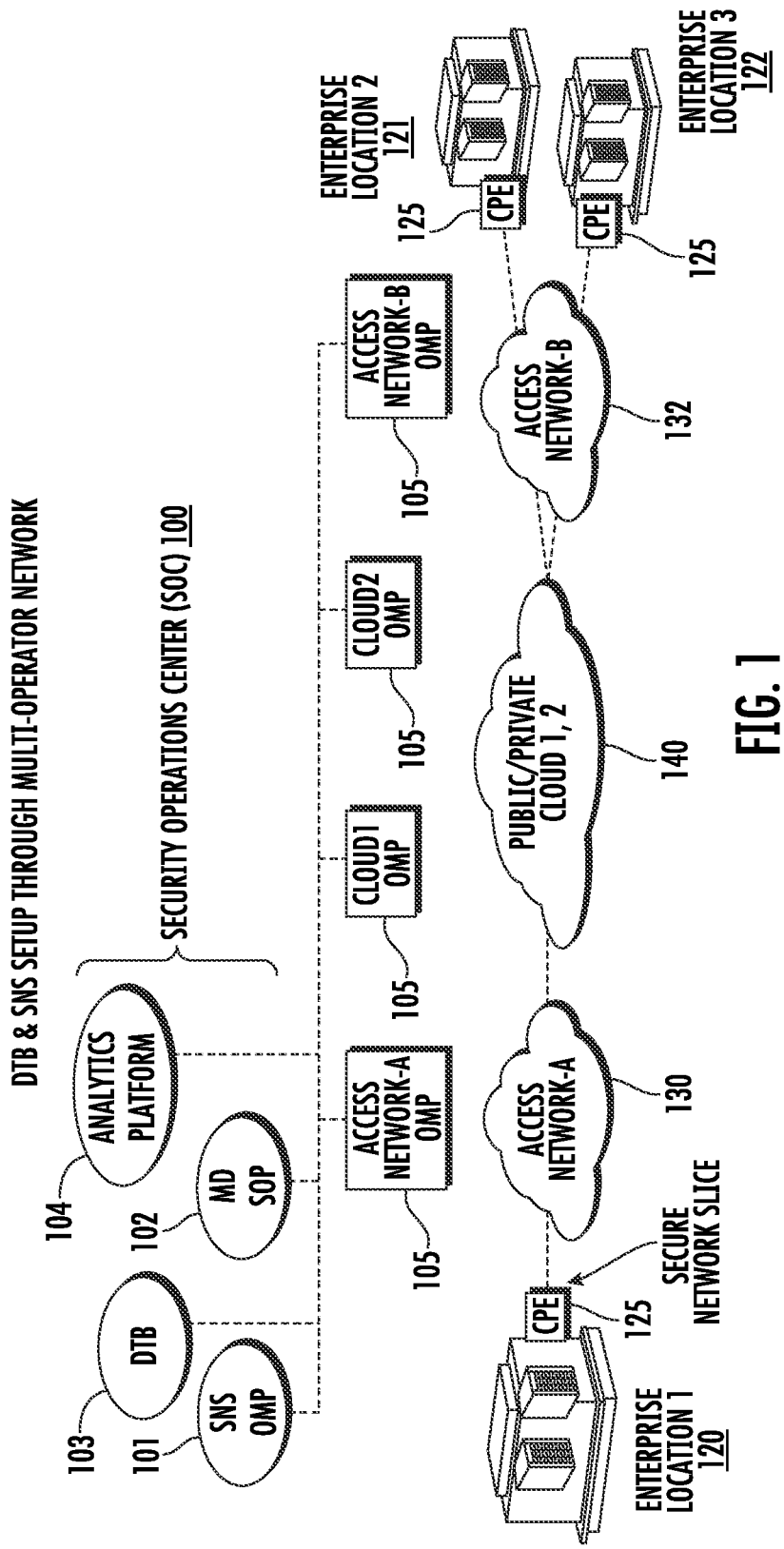
FIG. 1 shows an example deployment of a Digital TRUST Broker (DTB) in Security Operations Center (SOC) in a multi-vendor Network according to one embodiment.

The current disclosure extends the method of setting up secure virtual private lines (SVPLs) and Secure Network Slices (SNSs) through NEs with embedded eDCs that contain provenance and other meta data attributes, previously identified in U.S. Patent Publication 2021/0360401 and U.S. patent application Ser. No. 17/517,232, the disclosures of which are incorporated by reference in their entireties. These earlier applications (specifically U.S. Patent Publication 2021/0360401 and U.S. patent application Ser. No. 17/517,232) disclose setting up SVPLs and SNSs through NEs with embedded eDCs that contain provenance and other meta data attributes. The present disclosure extends these methods of setting up SVPLs and SNSs by trust assuring and validating the transit path NEs via interaction with transit operator Control and Management Platforms (CMPs) or Operation Support Systems (OSS) to determine provenance data, device attributes, and configuration policies when the transit NEs may not have embedded eDCs. Requiring embedded eDCs in the transit NEs reduces the candidate NEs that may be used for transit paths, increases the number of required operator and device vendor relationships and substantially increases the deployment time for generating and installing in eligible NEs. Thus, the present disclosure identifies methods of assuring trust using similar metadata attributes specified in eDCs as identified in the earlier applications via Service Level Agreements (SLAs) with operators while setting up SLAs and/or using the Digital Trust Broker identified herein that interacts with operator CMPs or OSS for setting up and validating these secure paths. The SVPL/SNS policies such as provenance and other attributes required of the NEs according to the SLA may be contained in a Slice Certificate that is trust assured by the operator in their network segment. If the SVPL/SNS traverses through multiple operator/service provider networks, each network segment will have its own Slice Certificate and end to end secure logical network is formed by stitching network slice segments of each operator. The DTB assists in mapping and bridging policy differences between different operator slice segments.

Additionally, the present disclosure identifies policy attributes in addition to provenance and other metadata identified in the earlier applications. For example, in addition to specifying allowed vendors, models and other parameters, the attributes may describe device capabilities such as Net Filters, CAP (content aware processing as in Broadcom devices) rules, Deep Packet Inspection (DPI) functions and others. The attributes may also describe management path options that a secure enterprise may orchestrate while setting up the SNS and/or alter when using a highly secure session between multiple end points. For example, the policy may require that when the session is active on the SNS path between ip-src/ip-dst (or MAC SA/DA), only that traffic should be allowed and other traffic should be blocked. Such policies may be triggered by the destination based on data scope or content. The policies may substantially limit security compromises. A secure enterprise or service provider may specify these policies within an SLA, that is maintained in policy servers or the DTB, or is specified as metadata in the device eDC, or the Slice Certificate that is incorporated into the end elements, and at entry and exit points in each operator network. The provenance data and additional attributes identified may be specified as metadata in enhanced PKI/X.509 Digital Certificates or EPIDs, attribute certificates and on-boarded via SZTP, Intel SDO and other formats.

The earlier applications define "Slice Certificates (SC)" that orchestrate the policies for a Secure Network Slice as a "Service Virtual Network Function (sVNF)". The present disclosure includes additional embodiments in the use of Slice Certificates and expands their use to other virtual network functions in SDN and cloud environments for increasing security and trust assurance. Unlike device certificates, Slice Certificates are associated with network functions may not be associated with a specific device and there may be several different types of devices involved in providing such a service. For example, a SNS may traverse several network switches, bridges, routers, proxies and other devices. Trust assurance and policies required may be dependent on the type of function the device is expected to provide. To this goal, the present application enhances the metadata extensions described in the earlier applications by incorporating hierarchy of network functions involved in providing the service, and provenance and other metadata for each function. For example, if an SNS includes transit L2 switches, bridges, L3 routers and L4 Split TCP Proxies, then the provenance data in the SC could specify that the L2 NEs may be from Nokia or Juniper; the L3 Routers may be from CISCO or Juniper and the L4 NEs may be from HP or IBM. The Service Certificate, like the Slice Certificate, orchestrates the requirements for plurality of hardware and software components that provide the service; for example, a secure database service function in a cloud or SDN could orchestrate distributed Hadoop server on IBM Linux on VMWARE on IBM Model X or HP Model Y HW platforms only manufactured in US.

Figure 5:
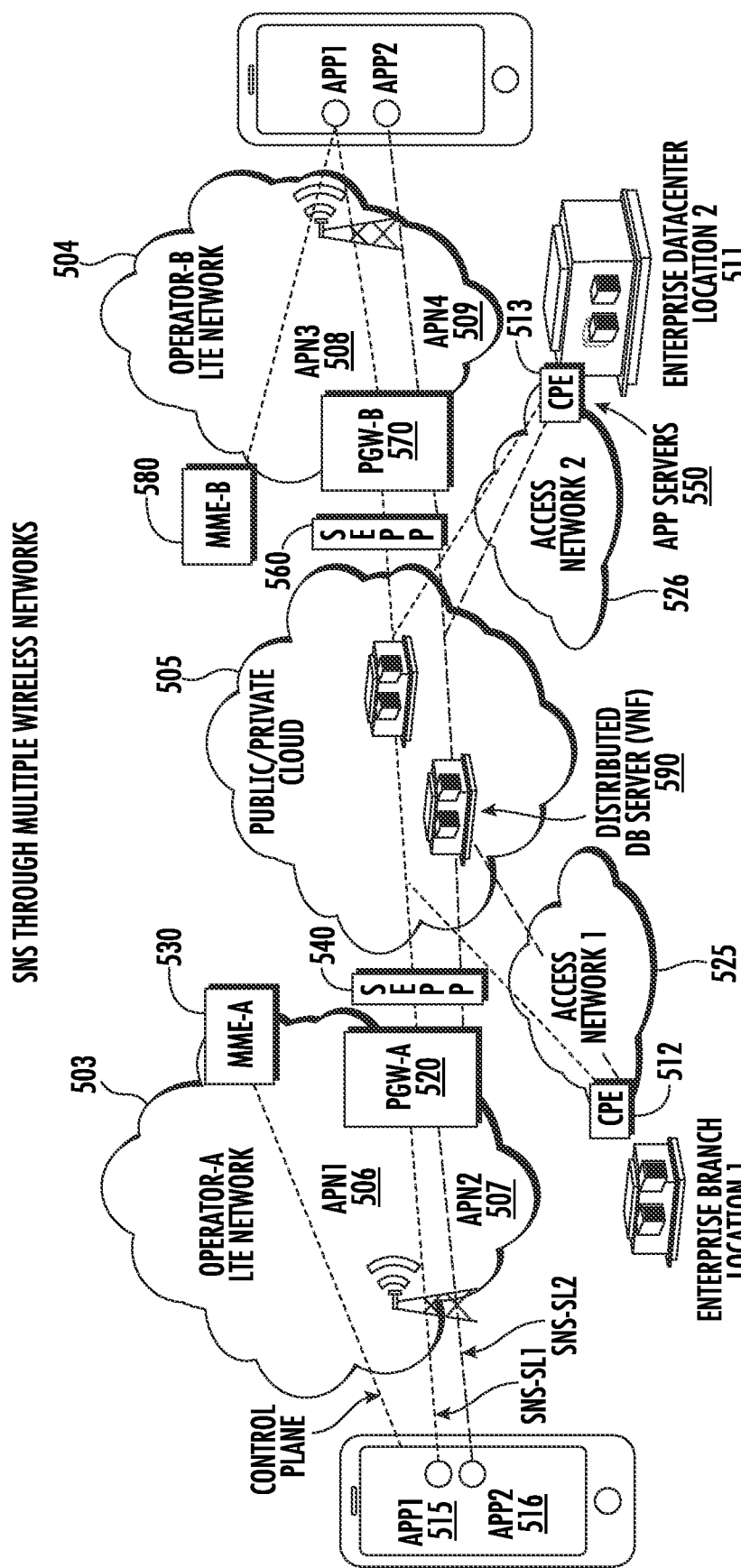
FIG. 5 shows an example of Multiple Secure Network Slices through LTE/5G Mobile Networks of two operators.

User device authentication and authorization in mobile networks is performed via control plane. After device is authenticated in the control plane, for example, using SIM or eSIM in UMTS/LTE, the device communicates with MME to establish a GTP-U tunnel in the user plane (UP). The QOS/QCI parameters of the user plane tunnel, and the Access Point Name (APN, Transport IP address) are established depending on the type of application (Voice Call, Internet Service, Video or others). The control plane parameters for establishing UP tunnels do not contain security level parameters for associating with different security policies. The present disclosure identifies using the APN parameter for security assured slices. As shown in FIG. 5, slices with different security levels, such as secure network slice Sl1 500 and secure network slice SL2 501, could be associated with different applications, such as App1 515 or App2 516, where each application specifies a different security level and/or a different APN, such as APNs 506-509.

As an example, the software applications (App1 515, App2 516) may require different levels of security policies, and hold the corresponding enhanced certificates. The client device establishes Control Plane (CP) connectivity to MME 530, 580 after it is authenticated and authorized by the mobile wireless operator. The two APPs refer to 2 different APNs (APN1 506 and APN2 507 in the mobile device. When App1 515 initiates a connection, through the CP it establishes GTP-U tunnel to APN1 515; PGW-A 520 terminates GTP-U tunnels and forwards to the PGW-B 570. In the user plane, the clients, Security Edge Protection Proxies (SEPP) 540, 560, and Cloud hosted VNF Service elements, such as Application Server 550 and database Server 590, hold the Digital certificates with metadata enhancements.

Further, as shown in FIG. 5, after the GTP-U tunnel is terminated in the User Plane Function (UPF) in 5G (PGW 520 in LTE), the UPF or PGW 520 may forward the user payloads to different Security Enhancing Proxies (SEPP) 540. In the transit network beyond the UPF or PGW 520, packet forwarding is controlled via routing algorithms (destination forwarding) or routes set-up via the SDN Network controller in each network domain. In the present system, the DTB orchestrates the transit paths by interacting with the network controllers of each service provider network depending on the security policies required for that network slice. The clients, the SEPP 540, 560, and transit VNFs (such as application server 550 and database server 590) in the transit network could hold the enhanced X.509 certificates to facilitate client orchestrated, path aware transit flows. Alternatively, the DTB may facilitate setting up SVPLs or SNS according to requirements or policies in the slice certificate for a specific security level or may receive the security policy requirements from an end user or a high security enterprise. The DTB may then determine the transit network and cloud or SDN providers, determine transit paths in each provider network by interacting with the respective control and management platform, determine the provenance and other attributes of each transit network element, construct forwarding paths between the required endpoints, and set up the logical network. These SNS or SVPLs may be set up by a security enterprise, which maintains and validates that transit path requirements of the enterprise are met before using the service, or frequently, or before the start of session that requires high security polices, per the fine-grain frequent monitoring and control principles of ZTA/NIST 800-207 Specification. These paths may be initiated by a high security application by connecting to the DTB, specifying a specific SNS or SVPL and the priority level it needs to connect to. The DTB verifies the user and user device meets the authorization and authentication policies required for specific logical network and enables connection to the specific APN/SEPP in the mobile network.

Migrating enterprise datacenters that process highly sensitive data such as financial institutions, the Department of Defense and others, to shared network and compute environments (such as SDN, NFV, public and private clouds) for greater flexibility, reduced investment, reduced operational cost increases security vulnerabilities. While cloud and virtualization environments may provide methods for protecting tenants using tunneling, virtualization, VXLANs, encryption and others, while transporting data through the multi-domain network, these protection methods end at the physical/virtual servers that process the data. The physical/virtual servers may be hosted in public/private clouds or in SDN data centers that serve multiple clients. The physical/virtual servers may share COTS hardware and software which further increases security vulnerabilities. A security compromise within one tenant's compute environment could affect other tenants. For processing a tenant's data at the hardware level, data need to be presented in the clear to the processing hardware, and if that processing hardware is manufactured in a region that is not trust assured, there may be security vulnerabilities, such as replicating or copying data which could be accessed by a different tenant application. Also, with ever increasing compute, memory, storage, network capabilities, a bad actor could identify and copy highly sensitive clear or encrypted data and use enormous compute resources to break security protection or install malicious software such as BOTNETS, or RANSOMWARE. A client enterprise may not be aware or control the type of COTS hardware, layers of virtualization that its applications run on. Such hardware, firmware, Hypervisors, client OS, and virtualization and other software may be from vendors from different geographic locations, different component technologies, different assembly and reseller locations.

Trust assurance and validation of the supply chain that includes, OEM, device components, such as line cards in a chassis, critical hardware on mother boards, storage, network interfaces, and security engines, of the underlying environment provides significant protection against security compromises. Collecting the supply-chain and logistics information from a plurality of vendor systems, associating them with the corresponding devices by correlating with device identity attributes such as MFG serial number, Physical Ethernet address, or device digital certificate (X.509), is a key attribute of the present disclosure.

The present disclosure extends the methods of setting up SVPLs and SNS, by trust assuring and validating the transit path packet forwarding and path terminating NEs (such as VNFs) via interaction with transit operator CMP (Control and Management Platforms) or OSS to determine provenance data, device attributes, configuration policies when the transit NEs may not have embedded eDCs. The methods of establishing trust in each operator network may be via Service Level Agreements (SLAB) while setting up SVPLs or SNS where the operator assures the transit path trust according to the enterprise requirements or using the Digital Trust Broker identified in the present disclosure that interacts with operator CMPs or OSS for setting up and validating such secure paths. These SVPL/SNS policies and the attributes required of all the NEs per SLA may be contained in Slice Certificate that is trust assured by the operator in their network segment. If the SVPL/SNS traverses through multiple operator/service provider networks, each network segment may have its own Slice Certificate.

Digital Trust Broker (DTB)

The DTB is a distributed software module that executes on specific hardware platforms with a Trusted Platform Module (TPM) that facilitates trust verification via X.509 Certificates. Alternatively, the DTB executes on COTS Platforms in cloud and SDN deployments or physical or virtual platforms that are trust assured by the corresponding service provider (for example, Amazon AWS, or Google Cloud). The distributed modules include a plurality of servers that function as a clustered server, proxies, and client applications that facilitate flexible deployments. The DTB provides a layer of advanced authentication and action triggers on top of Public Key Infrastructure (PKI) security infrastructure in a Multidomain and Multi-provider Computing and Network Environment. Using ONAP framework and enhancements, the DTB interacts with service providers operations and management platforms (OMPs), device vendor systems, PKI Components (such as OSCP Servers/Proxies), device reseller/assembly houses, and factory-floor/warehouse inventory management systems. The DTB correlates assembly information based on permanent device identities such as MFG Model Number, Serial Number, Ethernet MAC Address, and catalogs the information in its database for quick access in operational use. For example, the DTB may use this information to influence OCSP authentication responses. The DTB assists SZTP onboarding process by providing long term static device attributes such as provenance data or relative static attributes such as device operational location for enhanced metadata.

FIG. 1 shows the deployment of the DTB in a multi-domain, multi-provider network. The dotted lines represent the interfaces to the eco-system components. The Secure Operations Center 100 in FIG. 1 shows functional elements such as Secure Network Slice Orchestration and Management Platform (SNS-OMP) 101, Multi-Domain Security Operations Platform (MD-SOP) 102, Digital Trust Broker (DTB) 103, and Analytics Platform 104. The functional components may be Physical or Virtual Elements in a service provider NFV framework, or in a public or private cloud. These components interact with the operator and Cloud service providers' Network Controllers and Operations and Management platforms (OMP) 105.

Figure 2:
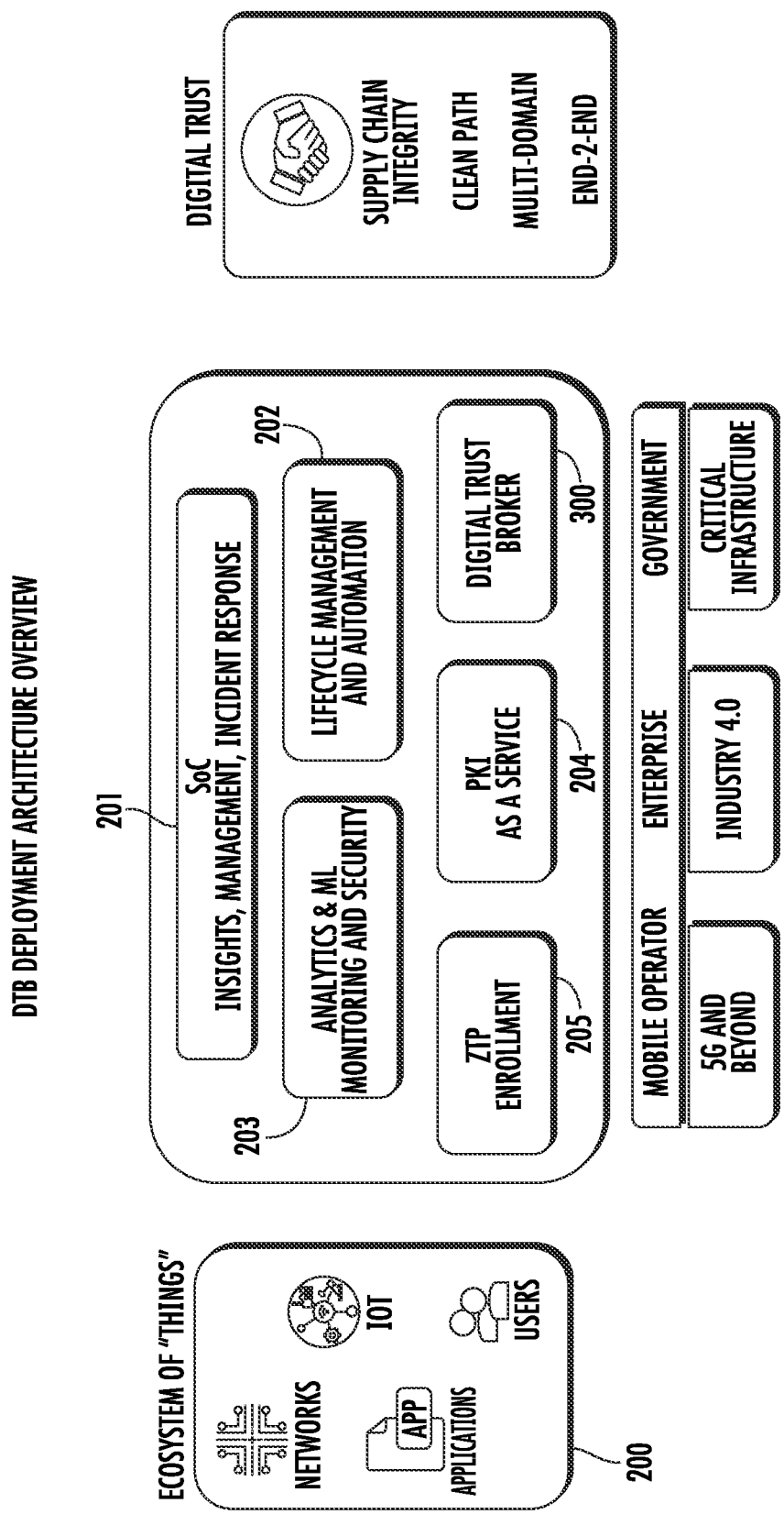
FIG. 2 shows the Architecture Overview of the DTB and its relationship with other functions in the SOC.

FIG. 2 shows the eco-system 200 of components that the Digital Trust Broker 300 interacts within the Security Operations Center (SOC) 201. The Lifecycle Management function 202 manages the creation, validation, and maintenance of SVPLs and SNS according to the policy attributes in the eDCs. The SOC 201 presents the User Interface for operations management personnel providing insights, such as notifications, alarms and other functions, based on the information computed by the Analytic and Machine Learning (ML) Modules 203, for SNS and SVPL paths created and managed by Lifecycle Management functions 202. The PKI as a Service module 204 facilitates generation, delivery and management of enhanced certificates (eDCs). The ZTP (Zero Touch Provisioning) module 205 facilitates configuration and onboarding of new devices into operational networks. The Digital Trust Broker 300 interacts with operator management platforms to configure monitoring and data collection for PKI Certificate flows, SNS/SVPL traffic flows (for example, IPFIX flows from network interfaces), information on IO activity in application servers and other data that serve as inputs to the Analytics and ML module 203. The Digital Trust Broker 300 receives results of Analytics and ML Module 203 and uses the Rules Engine 302 (see FIG. 3) to send notifications and action triggers to the eco-system 200.

Figure 3:
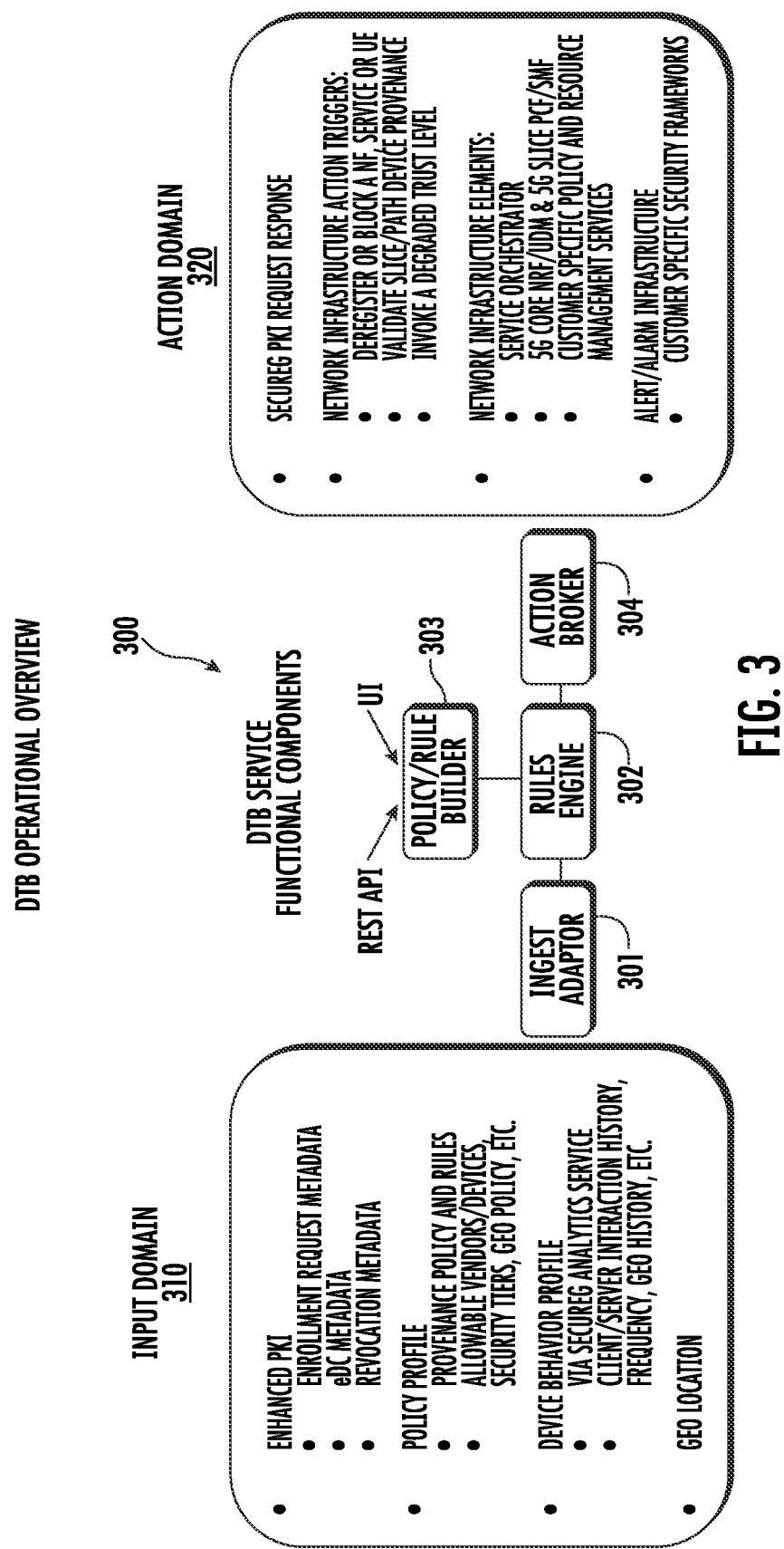
FIG. 3 shows an overview of the operation of the DTB including its inputs, its output actions, and the types of operations that are performed.

FIG. 3 shows functional components of Digital Trust Broker 300. The DTB 300 is a combination of several functional software modules, and the modules may be deployed on physical or virtual computing systems managed by the high security enterprise. The DTB 300 may be deployed in the enterprise data center or deployed in Cloud/SDN and managed by the secure enterprise. The DTB 300 provides UI and REST APIs for policy configuration and actions. The "ingest adapter" module 301 receives inputs and notifications from other eco system components and feeds them to the rules engine 302. The "Policy/Rule Builder module 303 generates rules according to configured policies. The rules engine 302 processes the inputs and feeds the results to the "action broker" module 304. The "action broker" module 304 generates triggers and actions as illustrated in FIG. 3.

As shown in FIG. 3, the DTB 300 provides a user interface and common API for validating trust assurance of end-to-end network paths, individual network segments, transit network elements, application services and others, by interacting with plurality of security and management platforms in the multidomain networks. The input domain 310 for the DTB 300 may include but are not limited to:
Enhanced X.509 Certificates (PKI certificate with metadata extensions)
Enrollment request metadata
validation of metadata (including provenance extensions) in eDC
Revocation metadata
Service Level Agreements;
Slice Certificates;
GEO location
Provided to the DTB by external service or DTB may dip into an IP-Based GEO location service
Policy Profile sourced from customer infrastructure or programmed by customer into DTB
Contains provenance policy and rules (ex. allowable vendors/devices, GEO policy, etc.)
DTB-Function: In 5G, this info may reside in the User Data Management (UDM) and requires the DTB to interface and pull from the UDM; and
Device behavior profile estimated by analytics from Client/Server interaction history, frequency, Geo-location history, and other sources.

The action domain 320 that the DTB 300 may perform based on these inputs may include but not limited to:
Compute a "trust score" for an entity based on a plurality of inputs.
The trust score may be used to influence the OCSP authentication response
The trust score may be used to trigger actions outside of the PKI infrastructure
Pass back go/no-go recommendation to Security System/Slice Orchestrator while setting up SNS or when a specific SNS use is initiated
Example infrastructure action triggers:
Deregister or block a network function, service or UE
Restrict to certain classes or service
Operate in a degraded trust level based on policy, possibly time-limited
Example infrastructure interface types:
Service Orchestrator
5G core Network Repository Function(NRF)/UDM;
5G slice PCF/SMF
Other policy and resource management services
Alert/Alarm infrastructure
Customer specific frameworks
Pass forward a "trust score" to a 5G function such as 5G PCF which may tie into whether a NF is allowed to participate in a slice type.

The DTB computes a "trust score" for an entity based on a plurality of inputs, where entities may include physical/virtual devices, Client/Server/Proxy application services and other components. The trust score may be used to influence the OCSP authentication response, and to trigger actions outside of the PKI infrastructure.

The DTB is primarily focused on the authentication of "entities" attaching to the network and bridging the trust between multiple providers, and multiple authentication methods. For example, two Secure Network Slices through a multidomain network that traverses a 5G network and a non-5G network may require different policies orchestrated by two different eDCs or by eDC in one segment (non-5G, SDN, Cloud) and via operator's authentication and authorization policies in 5G/4G, other Access and other network segments, or via Slice Certificates or SLA in some service provider networks. Service authentication and establishing user plane (UP) tunnels in 5G is performed using the control plane. While 5G defines Network Slices with different QOS for network sharing for multiple services, it is not based on different Security policies. The present disclosure associates different security levels with different security policies with different APNs in LTE or SEPP in 5G for separating user plane GTP-U tunnels in the mobile wireless network. Since APN/SEPP is operator specific, the DTB could bridge trust between two operator APNs or SEPPs, for a single end to end Secure Network Slice. For example, the authentication and service authorization in an operator network may use OAUTH2.0 while the rest of the network to the server may use X.509 Certificates.

Figure 7:
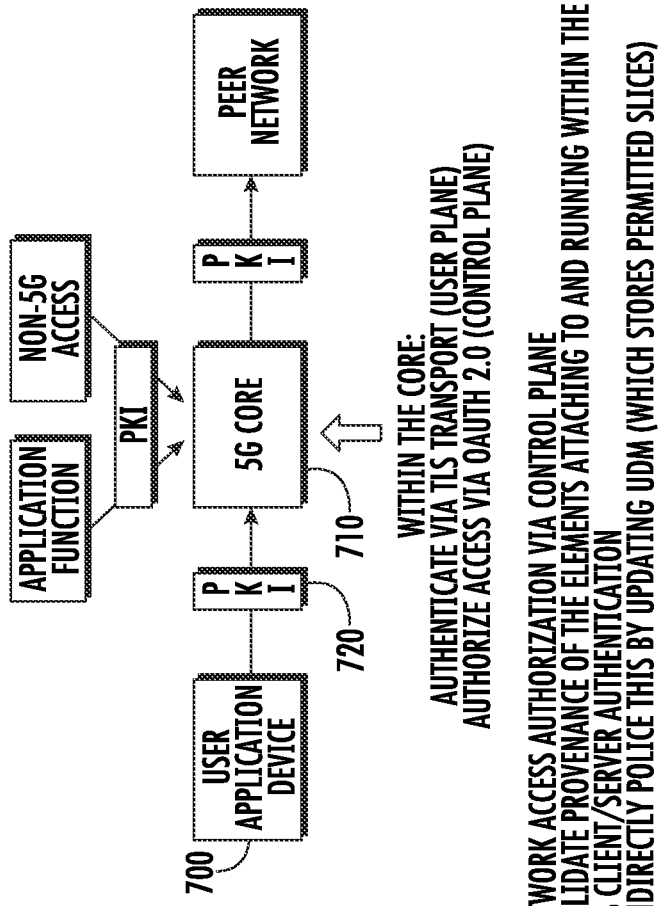
FIG. 7 shows authorization and authentication methods in 5G and non-5G networks.

FIG. 7 shows overview of authentication and authorization frameworks in 5G and Non-5G networks. When a user device 700, such as a mobile phone, attempts to access mobile radio network, the mobile network authenticates the user device and user service access policies by validating SIM/eSIM (Subscriber Identity Module or electronic SIM) and establishes a control plane session between user device 700 and the Core Access and Mobility Management Function (AMF). The user device 700 establishes user plane tunnel through the mobile radio and core networks to the user plane function or access point name (UPF/APN). The UPF/APN terminates the user plane tunnel and forwards to the destination through the core network. If user application uses encrypted sessions, such as TLS or HTTPS, to the destination servers, the two endpoints authenticate each other using PKI/Digital certificates over the user plane tunnel through the transit network. The TLS or other authentication is at the two endpoints, and the session may traverse through multiple transit network elements. High security enterprises may use secure network paths (SVPL, SNS) with transit path trust validation of transit NEs that allows only certain network elements, as orchestrated by eDCs. The DTB assists User Data Management (UDM) by identifying which SNS network paths are allowed to carry the user plane traffic after the user plane tunnels (GTP-u) terminate. In LTE and 5G, network access authorization is provided via the control plane. The PKI system component 720 may validate the provenance of the network elements attached to and running within the 5G core 710 during initial TLS client/server authentication. The PKI system component 720 may indirectly police this by updating the UDM, which stores permitted slices.

Figure 6:
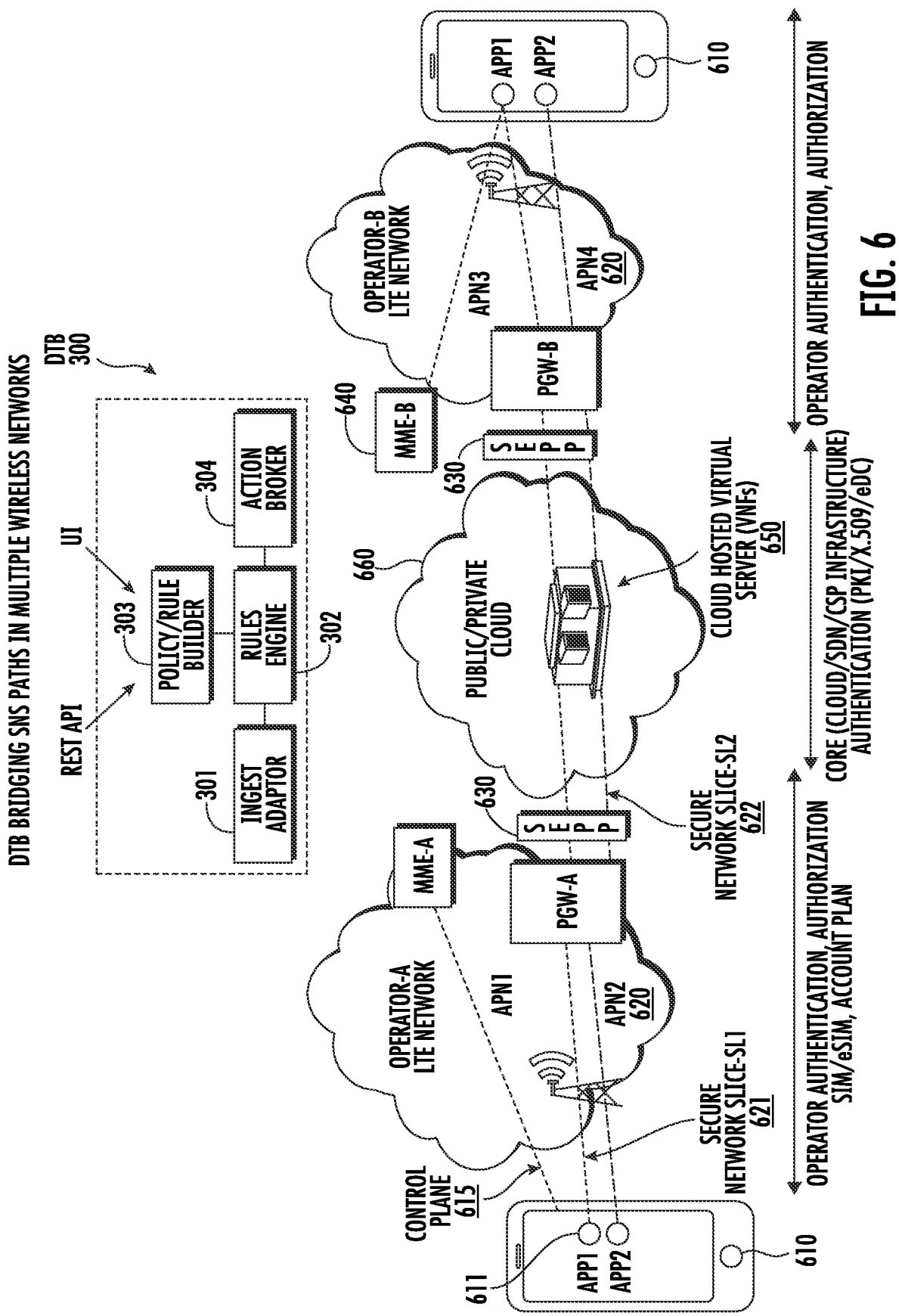
FIG. 6 shows Authentication and Authorization in LTE, 5G networks and non-5G networks.

FIG. 6 shows user plane datapaths connecting to the mobile devices 610 connecting cloud networks through APNs 620 that terminate User Plane tunnels, and forward the user payload packets through the Security Edge Protection Proxies (SEPP) 630 at each mobile operator's network interface to the Public/Private/Cloud/SDN network 660. In LTE and 5G Networks, the user device authentication for admittance to the operator network is via control plane protocols that create user plane tunnels to the PDN Gateway (PGW). The PGW connects to the non-5G network (e.g., Internet). User devices could establish TLS or other encrypted connections to servers using client and server PKI methods. Mobile devices 610 establish UP tunnels by first establishing a control plane session 615 to the operator's Mobile Management Entity (MME) 640. As disclosed herein, each APN 620 corresponds to a different security level SNS or SVPL. User Applications 611 in the mobile device 610 specify the corresponding APN (APN1 ... 4) in the control protocol while establishing the UP tunnel. The network paths between the SEPPs 630 through the transit multi-domain core network are trust assured according to SNS/SVPL methods. The SNS/SVPL paths 621, 622 from each mobile network could be between different SEPPs 630 or between SEPP 630 and Virtual Functions 650 in Cloud/SDN for cloud hosted servers.

FIG. 1 shows an Example Use Case of the DTB assisting in SNS setup between Enterprise Locations.

1. A High security Enterprise has 3 different locations 120,121,122 where SNS service is required. The 3 locations may be enterprise satellite locations or users access service from the 3 locations via Mobile Networks. Any of the locations may be under construction and the Access Network (AN) may not be available, and the SNS process would help the enterprise to select AN providers.
2. The DTB 103 may be a distributed cloud hosted software application or a distributed server with associated software in an operator network. The DTB 103 provides UI/Web-portal for enterprise to assist in setting up the SNS.
3. User/Enterprise connects to the DTB 103 and enters the locations 120,121,122 for SNS end points.
4. The DTB 103 determines alternative ANs 130, 132 at each location.
5. The DTB 103 interacts with each Access Network OMP 105 and determines entry and exit points; for example, connections to the core network, SDN or public/private cloud 140.
6. Each operator provides OMP 105 interfaces (for example ONAP) to the DTB 103.
7. The DTB 103 interacts with each transit operator, determines transit paths, NEs in each transit path, and their provenance and other required security policy data, such as, for example, the function type of NE, vendor name, HW model number, HW version number, MFG Name, MFG Location/Region, OS Vendor, Version, Geo location and other information. Each NE may or may not have eDC. While eDC consolidates the required attributes for NEs, and thus simplifies setting up and validating, requiring eDC may limit the selection of operators, and increases the steps required. Therefore, in this example, the DTB 103 validating the required NE attributes through operator management systems increases the options for creating the SNS. The operator OMPs 105 obtain the information of Network Management Systems (for example SNMP System-MIB, Interface MIB or others), and OSS (Operations Support System).
8. Enterprise determines which transit network segments, and the corresponding NEs that it could trust, negotiates with one of the AN operator at each location for the SNS Paths. AN operator installs a physical/virtual CPE that is trust assured that terminates SNS and interacts with enterprise systems. While CPE interfacing Access Network to the Enterprise network is well-known in prior art methods, in the current disclosure, the CPE terminates SNS at each location, interacts with DTB 103 and meets the security and trust requirements of the high security enterprise. Additionally, the CPEs 125 assists DTB 103 in bridging authentication and authorization policies between multiple security environments; for example, there may 2 SNS logical networks with different security levels at locations 120 and 121, and only specific computers and users at location 120 are allowed to access specific servers at location 121, and such accesses need to be time limited, transaction limited or otherwise limited. AN Operator negotiates with the other CSPs and Cloud providers for trusted path through their networks.

9. Alternatively, enterprise negotiates with each of the transit network and cloud service providers for path through the trusted NEs. Each service provider creates one or more slice certificates (if slices with multiple security levels are required) and communicates with the DTB 103. Each Slice Certificate serves as a commitment by the provider, that in the event of any network reconfigurations, updates, outages, rerouting, and path changes, new NEs also satisfy the Slice Certificate policies. For example, if the enterprise requires only L2/L3 devices from CISCO Models A/B/C manufactured in US, any path rerouting is allowed to use only the same type of devices. Additionally, each service provider notifies the DTB 103 of any interface failures, HW/SW updates so that the DTB 103 could revalidate the paths.

10. The DTB 103 assists in creating a Slice Certificate that covers all the transit operator network segments and incorporates slice certificates in the end points (for example, CPE devices at enterprise locations) or client applications in the mobile devices, if the mobile devices are required to access SNS.

11. If the slice includes virtual network functions such as proxies, caches DB servers, CDNs and others, the DTB interacts with the corresponding service provider to determine the trust assured devices according to the Slice Certificate.

12. The DTB 103 re-validates SNS paths periodically after the SNS are created to make sure the path is consistent with when it was setup. The DTB 103 also monitors daily access patterns of SNS by clients, for example at 8:00 AM on weekdays to do path validation before slice accesses. The monitoring also helps ML/AI algorithms to detect access behavior by different users, user groups and detect anomalies.

13. The description above uses Slice Certificate that orchestrates requirements for transit path NEs for SNS. However, an enterprise or operator client application could maintain requirements for transit path NEs (like what is contained in Slice Certificate) and communicate with a Cloud/SDN deployed DTB 103. The DTB 103 interacts with operator OMP 105 and OSS Platforms to determine NEs that meet the requirements and construct a transit path in each operator network segment, and setup end to end SNS. The DTB 103 and operator segments record the transit paths for SNS for maintenance and revalidation of SNS.

14. A high security enterprise could specify the security/trust requirements similar to what is specified in slice certificate to a TELCO/CSP or Access Network provider, and the service provider could create SNS that meets the requirements, work with partner service providers such as other CSPs or Cloud Service providers, and assure end to end SNS requirements, and provide APIs or methods of validating security/trust of transit paths. It is important to note such variations are within the scope of the current disclosure since the transit path needs to be setup based on provenance and other device attributes, device feature controls such as content aware filtering and others, and setup network slices as transit path aware compared to the normal L2, L3, and L4 methods and protocols.

In certain environments, such as IOT, end devices such as home thermostats, health care devices in senior centers and other devices, may be from a variety of vendors, countries, and regions. Requiring such devices to be from only an allowed set of vendors, countries, regions, or other characteristics according to eDCs severely limits the capabilities of the end system goals or significantly increases the deployment cost. Generating and installing the eDCs (enhanced Digital Certificates with provenance and other metadata) may significantly increase the deployment time and cost since this operation may require establishing relationships with the corresponding vendors and vendor eco-system components such as CAs, OCSP Servers etc. Additionally, some of the devices, for example, sensors may not have the ability to store X.509 Certificates or may use different trust methods such as EPID. EPID is Enhanced Privacy ID by Intel. IOT deployments use IOT gateways close to the IOT devices that communicate and control many devices. For example, a senior center that uses several medical devices uses a gateway that communicates and controls a plurality of IOT devices in the center. Such devices may use a plurality of device, user and service authorization methods such as PKI/X.509, EPID, OAUTH2.0, X.500, RADIUS and others. A high security enterprise restricts the use of such devices to specific locations, specific applications/functions and transports the collected data or data processed at physical/virtual edge servers (for example in IOT Gateways) over encrypted sessions through multi-domain network to virtual or physical datacenters or computing elements that meet their Security and Trust requirements. Every processing element in this path may be trust assured via eDC, or via SLA or Slice Certificate. Additionally, the enterprise may require that transit network paths are trust assured at a specific security level via eDCs or SLAs. The DTB bridges trust between multiple authentication and authorization systems. The present disclosure extends the functionality of the DTB to include devices and systems that are authenticated and authorized in their own constrained domain of operation while connecting path assured secure network slices and/or using high security services in distributed and shared computing environments or high security data centers. For example, the IOT Gateway may be trust validated and incorporates eDC or the IOT gateway along with all the client devices may be trust assured by the corresponding service provider or enterprise and interface to Secure Network Slices through a trust assured CPE. The DTB assists in brokering security and trust policies between the plurality of disparate authorization and authentication methods. Additionally, the present disclosure identifies security and trust assurance of distributed systems components that offer services to high security enterprises by requiring each component and virtual element to hold the eDC with enhanced metadata policies or trust assured by the corresponding service provider that the devices meet the provenance and other meta data attribute policies or meet the meta data attributes in Slice certificates.

Figure 4:
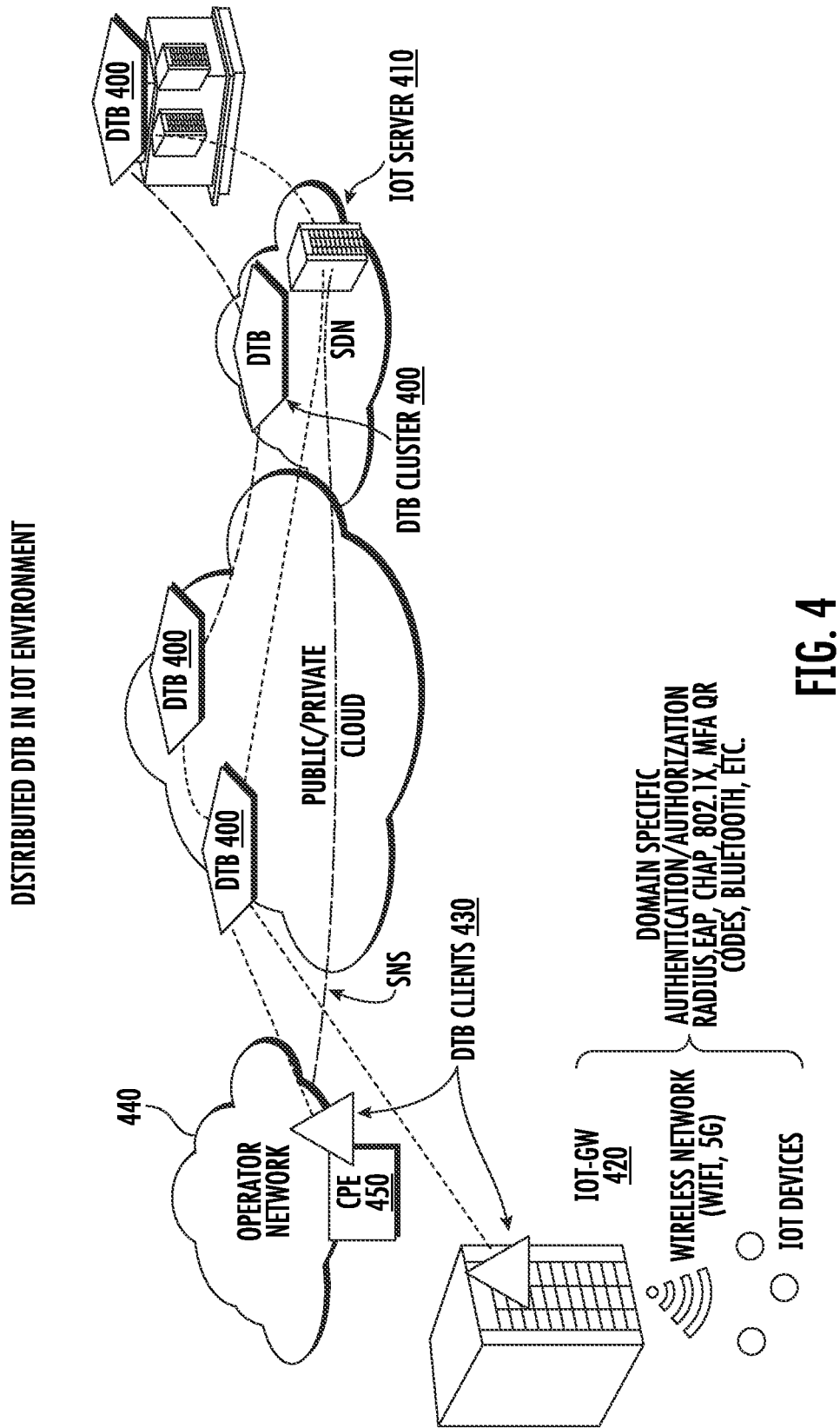
FIG. 4 shows an example deployment of a distributed DTB in an Internet of Things (IOT) environment.

FIG. 4 shows the deployment of DTB Cluster in an IOT environment. The figure shows plurality of components that make up a DTB Cluster 400 disposed in enterprise, cloud, SDN datacenters, and operator networks 440. The DTB Clients 430, which may be software applications, are located in the IOT gateway (IOT-GW) 420, and the customer premise equipment (CPE) 450 that interact with users and IOT devices. The DTB clients 430 interact with the DTB Cluster 400. In the localized IOT environment, the IOT devices and the IOT-GW 420, that use WIFI, Bluetooth, NFC, local LAN and other protocols, may use domain specific authentication and authorization methods of trust assurance such as EAP, CHAP, MFA, RADIUS, 802.1X, QR Codes, Bluetooth and others, while interfacing with IOT-GW 420 or CPE 450. In certain embodiments, the IOT devices and the IOT-GW 420 communicate using a wireless network, which may be WIFI, Bluetooth, NFC, 5G or others. The DTB clients 430, in coordination with the DTB Cluster 400, bridges the trust between the IOT environment and SNS logical networks that transport sensitive data to trust assured IOT Servers 410 in Cloud/Enterprise Datacenters.

Slice Certificate and Secure Network Slice as a Service

5G Service Based Architecture (SBA) defines service as a Virtual Network Function (VNF). SNS provides a secure logical network service between plurality of end points. Accordingly, SNS could be considered as a VNF and a Service. Slice Certificates orchestrate the security and trust required for each network element in the slice transit path. The physical or cloud network device that terminates the Secure Network Slice (SNS) could hold the Slice Certificate. If the service crosses multiple provider networks with different policies in each network, a network switch/bridge/router could bridge between policies between the two networks or an application server/proxy could terminate client connection and function as a client and connect to next-hop server. Thus, each segment would be a virtual hop. The DTB assists in brokering the trust between the two virtual hops. For example, if the first segment is in a CSP (Communications Service Provider) and all the transit NEs are from Vendors "A, B", and the second segment is a cloud network with transit NEs that are from vendors "C, D", in the event of NE failures or network reconfigurations, the replacement devices need to be compliant with the SC policies in the corresponding segment. Alternatively, the DTB (in control and management plane) in combination with Enhanced Security Bridge (eSB) bridges the policies between the two network segments; for example, allowing only SNS level 1 path, and performing additional DPI functions for SNS Level 2 paths.

The slice certificate orchestrates trust policies that all network elements in the transit path of the network slice are required to meet. The network elements (NEs) include packet forwarding NEs (network switches, bridges, routers) or path terminating NEs (proxies, servers, application gateways that terminate transport network protocols). The security vulnerabilities and ill effects of compromised security and malware are more severe in path terminating virtual or physical computing devices such as proxies, servers and application-gateways since VXLAN or GRE tunnels, and encryption terminates before the application data is processed. When the transit network tunnels or transport layer (IP, TLS and others) or other encryptions terminate, user/application data will be in the clear, and any security vulnerabilities will significantly compromise data security of the enterprise. For example, many websites use HTTPS that encrypts traffic in transit network; however, if one or more devices that host the service are security compromised, user login credentials, their locations and other parameters may get exposed. Thus, it is essential that each of the physical/virtual devices that host the services is trust verified and holds the enhanced certificates with security policy metadata (for example, they are from specific vendors, models, version etc.) or trust assured by the service provider that they meet the attributes in slice certificate. It is essential that the device trust is revalidated periodically and at the start and during high security sessions, since any certificates that a device, a VM or application holds may expire, be revoked or be security compromised. The policy metadata may be specific to the service or function that it is performing. For example, if the device is performing a routing function, the policy may specify devices from CISCO and JUNIPER Networks with specific software versions are allowed. If the device performs mail server function, the allowed devices may be from REDHAT, IBM or HP; if the device needs to be part of a distributed database server, then the enterprise may require the devices from IBM, Oracle, or Microsoft with specific OS and application versions. To this goal, the present disclosure expands the metadata in the Slice Certificates to include the types of functions a transit NE in the path of SNS performs and the associated provenance and other metadata attributes. Thus, the Slice Certificate contains network functions such as L2 Switching/Bridging, L3 routing, TCP Proxies, Application servers, and provenance and other policy metadata for each function. Each transit NE holds the eDC or trust assured by the service provider corresponding to the function(s) it performs in the slice path.

FIG. 8 shows an example Slice Certificate according to one embodiment for a SNS that includes NE functions such as L2 packet forwarding, L3 Routing, tunneled IP (GRE, VXLAN), L4 proxies, and Network Function servers such as a cloud hosted distributed DB server. The example shows, for devices serving L2 bridging/switching functions, a list of allowed OEMs, their manufacturing locations/regions, list of allowed vendors, models and other data. The certificate metadata shows security level (1,2,3,4 etc.), each function, its associated provenance data, function-feature configuration attributes and security policy attributes, that are defined by the enterprise and serves for driving the Service Level Agreement (SLA) with the service providers. The function-feature identified herein specifies the important features of the specific device serving the function, and guides in driving policy configuration for the specific device. For example, a transit router may be required to support static routing, net or IP filtering, packet mirroring control or other functions. It is not intended that each detailed configuration/policy setting on each of the devices is specified in the certificate. It is envisioned that the attribute value refers to a policy document that describes the required policy in detail that the organization maintains. While negotiating the SLA, each of the transit service providers receives the policy document and agrees to assure the policy in the devices performing that function. It is envisioned the security enterprise that intends to use the SNS service, identifies the vendor devices and models that performs the function, the device capabilities and configurability while generating the SNS certificate and the associated metadata. For example, if the SNS at a specific security level is allowed to forward only between specific IP Addresses and/or specific L4 Port numbers, then the NE device must have the Content Aware Processing/Filtering or DPI capabilities. Such features and policies may be dependent on the specific physical/virtualization layer in a device in NFV/SDN/Cloud environment that carries traffic from multiple enterprises. While the security policies for SNS and Secure Network Functions are described above as metadata in Digital certificates that serves to orchestrate setting up SNS, it is not essential they are orchestrated in a Digital certificate. In another embodiment, the security and trust policies may be communicated via APIs to a software module that operates as a Virtual DTB in SDN/Cloud infrastructure which maintains the policies in a policy data base and communicates with the operator Control/Management and OSS platforms and manages setting up and maintenance of SNS. An enterprise that manages and services sensitive data decides the type of trust-assurance required—whether eDCs that could be trust verified by CAs or Slice certificates that orchestrate the transit NE trust requirements, or trust assurance via SLA by the underlying service providers.

Additionally, in another embodiment, digital certificates (X.509 or Attribute Certificates etc.) are used to orchestrate security policies for end devices that connect to Secure Network Slices in a multi domain multi-operator network. These certificates could specify policies for each provider network that may use different authentication and authorization methods. Additionally, if the specific client enterprise uses VNFs such as content caches, application proxies, or application servers, eDCs or Slice certificates dictate trust policies, such as provenance data, supply-chain/logistics for such VNFs. Thus, unlike VPNs, the SNS as a Service covers both transit network paths, and computing functions. It is envisioned that a CSP provides such a service by assuring the orchestrated policies in its own network segment and uses a VNF to bridge to the next provider NEs. Slice end-points hold slice certificates that contain each network function in the transit path, and the trust attributes for transit physical/virtual NEs and VNFs.

Example security policies that a SC could orchestrate may include, but not limited to:

1. allowing only specified range of domain names, or IP addresses as sources or destinations to minimize DOS attacks, BOTNET Vulnerabilities etc.
2. Specifying the allowed data object types that could be accessed or transported over the specific SNS; many of security attacks are via downloaded executables, java scripts etc. Since the end point (that is terminating network layers, such as proxy, that has visibility of application types, then downloading executables is minimized).
3. Application behavior—while SNS is in use by an endpoint, application behavior could be monitored, inferred metrics exported to the DTB and anomalies detected. For example, when an app connection is active, determining which other remote connections are active or allowed, allowed traffic rates, data volumes, CPU, and IO cycles and other parameters. For example, RANSOM-ware malware as part of its attack encrypts all files making them non-readable by the users. This involves lot of file IO Activity to the filesystem or storage server; monitoring increased write activity to the filesystem could detect such attack early. While the actual methods of such anomaly detection are outside the scope of the present disclosure, the "Slice Certificate" that defines the "Secure Network Slice", as a service over transit network that includes transport NEs, and path terminating VNFs such as proxies, servers and other components, and the security policies that it assures, and monitoring session behavior of sessions that use SNS paths and detecting anomalies via ML etc., algorithms are subject matter of the present disclosure. It is envisioned the end systems or virtual entities or applications that terminate SNS hold the "SCs" and perform these policies. For example, a "virtual container" running on a Client OS, on a Host OS running on a COTS platform could perform these policy functions.

Adding network function types and the associated meta-data in device eDCs and slice eDCs facilitates a high security enterprise to specify devices/models by specific vendors. For example, allowing devices from vendors "A, B" for L2/L3, and from "C,D" for application proxies. It increases the choice of devices available for the security enterprise to choose from and reduces costs. Additionally, enterprises that require medium security could use a slice certificate that only specifies security policies for cloud hosted Secure Network Functions and use TLS encryption methods to connect from their devices.

Example Operation of Slice Certificate from Mobile Wireless Device through 4G/5G Network to a Cloud Hosted Server In this example as illustrated in FIG. 5, a high security enterprise uses two different applications 515,516 with differing security levels. App1 515 uses an application server 550 in their datacenter with perimeter security, and App2 516 uses a cloud hosted distributed database server 590. The enterprise creates two Slice Certificates at two different security levels in coordination with the DTB and enhanced Certificate Authority (CA). The enterprise negotiates with the CSP to create two Secure Network Slices to their remote locations 510,511. The SNS traverse two access networks 525,526 at edge locations, core network and a private cloud 505 that hosts the database server 590. The CPEs 512,513 terminate the SNS at enterprise locations. In addition, the enterprise uses two mobile client applications 503,504 for its employees to access the servers. Employees also access internet connections from their mobile devices which use 4G/5G defined methods.

(1) The access network providers use CPE equipment to connect enterprise network to their networks and to internet.
(2) The DTB, in coordination with transit service provider management platforms, validates the security and trust of transit NEs that carry the two SNS's as orchestrated by the corresponding slice certificates.
(3) The DTB installs the slice certificates to the CPEs in coordination with operator CMPs.
(4) Enterprise users that access the SNS install the corresponding mobile applications. The applications carry the corresponding eDCs which assure they are from specific vendors, versions, regions. The applications with eDCs assure they are client applications with security requirements to communicate with corresponding servers.
(5) Mobile devices use control plane (CP) protocols as defined in the 3G/4G/5G standards and connect to RNC/MME/AMF of the corresponding mobile wireless network. The following descriptions use 4G/LTE terminology; however, the methods are similar in 5G networks with the difference that the 5G system components have differing terminology. For example, Mobility Management Functions are managed by MME in 4G/LTE and by AMF in 5G Network.
(6) The mobile device first attempts to establish a CP connection to the MME; MME allows this connection after authenticating the user device. The authentication uses SIM (or eSIM), that serves to validate user account (wireless service) is valid (not expired), data volume, messages, or voice calls did not exceed the user plan limit for the current time period. It does not validate the user device (for example, the user could move the SIM to a different device); also, the wireless network does not validate user credentials—thus any user that has mobile device with the SIM could establish wireless service. User Identity authentication is done by the mobile device with "Screen Lock" and passcode or biometric recognition such as facial recognition.

(7) The device establishes User Plane (UP) Tunnel to the APN depending on the type of application the user activates. For example, for internet connection, the device connects to the internet APN. The CP also specifies QOS/QCI parameters for the UP tunnel depending on the type of application. In some cases, the device establishes default bearer and UP Tunnel when CP connection is established, and changes to a dedicated-UP tunnel (dedicated bearer) with different QOS/QCI parameters, to same or different APN depending on the type of application. 5G standards define network slices with different QOS/QCI parameters for different services. Thus, network slices in 5G are based on QOS. In addition to QOS based slices, the current application and the earlier applications describe Security based Network Slices where each network slice requires that the transit devices are trust assured via eDCs or Slice Certificates, or operator SLAs. DTB assists in setting up such SNS and their monitoring and trust validation.

(8) 5G Architecture defines SEPP (Security Edge Protection Proxy) that serves to protect between different security environments. Thus, the UP tunnels terminate in a specific APN or SEPP that functions as proxy to the next service provider network, such as Cloud or SDN. All the devices in the wireless operator network are trust assured with the authentication/authorization methods of the operator. For example, over the air traffic is protected by encryption, and coding methods against spoofing or eaves dropping. All the transit devices are procured and managed by the wireless operator and requiring additional security policies such as they are from specific vendors (provenance data, eDCs) for such devices significantly reduces the available options for high security enterprises. Thus, the present disclosure identifies the additional policies in the Slice Certificates be enforced when traffic enters and leaves the wireless network, in the mobile device and SEPP.

(9) When a mobile user installs an application in the device that requires the use of a SNS, the application interacts with the DTB and the DTB incorporates the Slice Certificate at the required security level depending on the server(s) it needs to connect in the Cloud or Enterprise Datacenter. Additionally, the DTB orchestrates the APN/SEPP associated with the specific SNS. The association could be based on the DNS name or IP Addresses of the destination server(s) or security level.

(10) When the user activates the application, the application establishes a CP connection to the MME/AMF of the wireless mobile network and uses the CP to create a UP tunnel to the APN that corresponds to the SNS. Alternatively, if the mobile device has already a default/dedicated bearer for other active applications on the mobile devices, it sends DNS request to resolve DNS name of destination server(s), and recognizes it need to access the servers via the SNS and initiates UP tunnel to the corresponding APN.

(11) After the UP tunnel is established, client application attempts to establish secure TCP connection (HTTPS, SSH etc.); during this process, the device notifies the DTB, which validates the user identity, for example with MFA or biometric validation, determines his departments, and access privileges for connecting to the remote server by communicating with the enterprise policy servers, and validates the user is allowed to utilize the specific secure network slice. This mechanism stops unauthorized users before connecting to the remote server thus limiting attacks such as DOS, DDOS etc.

(12) Client application then connects to the remote server, and generates an application request, for example, a database query for specific data segment. The remote server, depending on the type of dataset being accessed, checks with the policy server whether the user is authorized to access and access limits such as Read, Write, Modify, number of records allowed to access, time limit and other parameters and notifies the DTB, which logs the events for Autolearning and control. The policy server enforces the policies and terminates the user session if allowed limits are reached.

Slice Certificate Example for Secure Network Function (NF) as a Service

Some VNFs, such as routers, gateways, and proxies, could be in the path of the SNS as outlined above. Similarly, a Split-TCP Proxy or Web-Cache or a CDN Proxy that terminates transport protocols and delivers cached, prefetched or CDN partner content to minimize response times could also be in the SNS paths. In addition to transport network paths, Slice Certificates may also specify Secure VNFs in transit or termination points of SNSs. Additionally, a Slice Certificate could only specify security policy requirements for "Secure Network Function or VNF" as a service, and other endpoints could connect using well known encrypted TCP sessions (for example, TLS, HTTPS, SSH and others). Thus, "Slice Certificate", and the SNS generally refers to multi-point logical network that may include other NFs/VNFs, "Slice Certificate" may be associated with NFs (Servers) or VNFs (Cloud Hosted Servers) that have single point connectivity. In this use case, the Slice Certificate may be referred to as "Service Certificate". For example, an enterprise with medium security needs could rely on transport layer encryption but require security and trust assured application services (database, mail, application proxies, servers) in shared network environments so that virtual and physical platform components that host the "Secure Network Function" and process the user data after the encrypted tunnels end are trust assured per "Slice Certificate" and hold eDCs. For example, only devices, models, and versions of allowed Vendors manufactured in US and operating in locations "A, B, or C", are allowed.

Considering a distributed Hadoop cluster as an example NF that a High Security enterprise intends to deploy an application or service using shared resources in NFV/SDN/Cloud environment, the security policies may require high level trust from the underlying physical/virtual devices. In this example, "Distributed Database Server function" running on Hadoop Cluster is the "Secure Service" that the certificate orchestrates. Hadoop cluster uses Management nodes, Webserver Nodes and other components that interact with the remote clients and manage the compute, storage and other resources internally transparent to the clients. Thus, part of these management functions may involve adding more compute nodes at certain times or replacing a problem node, or managing redundant nodes for protection against node failures. The Slice Certificate orchestrates the trust requirements (for example nodes in cluster should hold eDCs). When the cluster configuration changes, the DTB interacts with Management nodes and validates trust compliance. Application resource needs, or device failures, or edge computing may require application migration or expansion to other resources at different geographic locations. The DTB monitors and validates these resource changes, initiates recovery actions if non-compliance is detected, orchestrates placement of virtual appliances (such as proxies, caches) for edge computing.

Trust Assurance of Supply-Chain and Logistics

Many network, storage and computing devices are manufactured in multiple countries and regions by Original Equipment Manufacturers (OEMs) and shipped to system-assembly houses. In some cases, the OEM devices may be rebranded with additional features, additional quality controls and other features by different Brand Name Vendors. Additionally, as part of the system build, other companies, such as platform assembly, software installation, and QA houses, may receive and work on the devices before a system is received by a high security enterprise. Also, when important system components such as CPU motherboards, Chassis linecards are shipped from distant locations, they may traverse locations that could tamper with or alter these components. Assuring security and trust, that the components are manufactured by trusted OEMs, Brand Name Vendors, Assembly enterprises, and tracking logistics from start to end is essential for enterprises that process highly sensitive data. To this goal, the present disclosure identifies adding supply chain and logistics information as metadata in the Enhanced Digital Certificates (eDC).

Supply chain and logistics data may be classified according to the Table 1 based on the lifetime of attributes, and the scope (global or per operator/enterprise) to determine where the data could be maintained. For example, if trust validation required is global across internet from device manufacturers at different manufacturing locations, this data could be in PKI digital certificates and authenticated using PKI methods. Other policy attributes such as number of flows, network usage (latency, BW, frequency/use time), Geo Location, types of allowed services/network-function, data access authorization are operator specific and served by other methods (OAUTH2 Authentication/Authorization or Attribute Certificates). For example, mobile wireless operators use SIMs or eSIMs to validate user account and service plan before allowing the connectivity. The SIM/eSIM is issued by the operator, and the wireless connection terminates in their network and traverses an APN/PGW while connecting to internet or other networks. A user connection that spans multiple operators/cloud/enterprises may use different policies on each segment. The DTB bridges between multiple domains by serving as a proxy in each domain, extracting policy attributes and mapping when possible, and initiating service denial otherwise.

TABLE 1

| Attribute Name | Global/Local | Lifetime | Method |
| --- | --- | --- | --- |
| MFR, Model, SNUM, MF Location, MAC Address | Global | Forever | PKI |
| Deployment Geo-Loc | Local (specific operator) | | OAUTH/PKI/Other |
| Allowed Vendor list | | Medium | PKI |
| Assembly Vendor Name, Location (Manufacturing History) | Global | Long | PKI |
| Installed Modules | Local | Medium | PKI/Other |
| Allowed/Disallowed GEO Loc | Global | Medium | PKI |
| Network Behavior Profile | Local | Medium | OAUTH/Other |

TABLE 1-continued

| Attribute Name | Global/Local | Lifetime | Method |
| --- | --- | --- | --- |
| (Number of flows, BW, time limit) | | | |
| Reseller Name, Location | | Long | PKI |
| Asset Tracking label (RFID), Barcode, QR Code etc. | Local | Short-term, | NON-PKI |
| Security Level 1 [1] | Global | Med | PKI |
| Security Level 2 [1] | Global | Med | PKI |
| Security Level 3 [1] | Global | Med | PKI |

In Table 1, there are multiple security levels, for example SL1: normal, SL2: medium, SL3: high. The rules associated with security levels may be specified by the service provider that is providing the service. The policies associated with a security level could be specified within the device, slice, and other certificates, or maintained in provider policy database [PCF], or the DTB. The DTB maps the required end-to-end policy with the provider's network segment. Example policies include provenance data such as MFG Name, Model Number, MFR Location, MFR History, Geolocations, prohibited vendors, types of routing (client specified or destination routing, transit-path aware forwarding and other types), permitted virtualization layers (client OS, hypervisor, VM, container etc., types, and versions), alternate route policies, mirroring rules, number of flows allowed through interface or device, use time and other parameters.

Device certificates (X.509) are generated in manufacturing and embedded in hardware, the operating system and other applications. Additional attributes such as Vendor, Model, Manufacturing history (i.e., where assembled), Serial Number, Model Number, SW/Firmware version, installed modules, upgrades, environmental/behavioral data such as allowed/disallowed Geo locations to operate within, whether allowed to relocate, could be onboarded at the enterprise procurement site using Secure Zero Touch Provisioning (SZTP) or another method. Devices, such as interface linecards, Chassis, Motherboards and others, store static information such as Manufacturing Serial Number/Model/Date/Location, device certificates, in hardware components. The digitally stored data in certificates or other device components is available only when device is powered up. Some of the information may be etched in a human or machine-readable form, copied on to device tags or packing labels, for billing, accounting, and tracking reasons. Asset-tags such as Bar-Codes, QR Codes, RFIDs, Shipping labels and others, may be generated independent of product specifics, post manufacturing and may not have device identities. They are normally tracked and accounted by device model number, serial number, shipping location etc. For cross correlating the enhanced certificates and other attributes stored digitally in the device, the present disclosure identifies adding permanent device identities such as Serial Number, physical MAC address etc., as metadata in the certificate. Cross-correlating the permanent device identifiers from certificates with post manufacturing data on device labels facilitates cataloging information for each device in a database. Also, the supply-chain, and logistics data may vary, as the product is moved to different locations and companies. Such logistics information is very important in high security environments (such as DOD, Tier-1 Operators) since at intermediate locations, the devices could be altered, or malware installed which compromises security of the device when in operation. By interacting with the cataloging systems, the DTB assists in certificate metadata onboarding (using, for example, SZTP), or in operator PCF systems so that device trust could be verified at the start of a high security use, for example when selecting a transit network path for Secure Network Slice.

While the certificate data is public and readable, since it is stored digitally, it may only be read when device is powered. By including the device serial number in addition to the Certificate Serial Number, since device serial number gets marked visibly, the certificate could be associated with post manufacturing data, and during onboarding at operator procurement location, the supply-chain data could be onboarded. Methods of onboarding such data onto digital certificates is outside the scope of present disclosure. However, the collection of such data by the DTB from multiple vendor systems, correlating them, and generating data for the certificates, and/or maintain the cross-correlated data in a database or other recording keeping are identified herein.

Validation of Interface Cards, Server Blades in a Chassis

In chassis-based systems, such as blade-servers, network switches/routers, and storage devices that hold multiple devices, or a complex motherboard that contains hardware/software daughter cards, the components may be from multiple vendors. The assembly of such a chassis may be at an assembly vendor location after the chassis and linecards are manufactured. Trust assurance for such a system requires verifying all linecards post manufacturing at an assembly site and/or at a vendor procurement site before the device is installed in operational network is essential. The present disclosure teaches generating a "Chassis Certificate" that assures all the linecards, daughter cards and other components in a chassis are trust verified, and contains the information about the types, vendors, model numbers and other information of the components and their Digital Certificates, to assist in revalidation and tracking of expired or revoked certificates.

The chassis certificate may be created by the assembly vendor in coordination with the CA that trust assures the credentials, location, and other information of the assembly vendor after validating the authenticity of each of the linecards, for example, verifying the X.509 certificates of the linecards, and that they are not expired or revoked. Alternatively, the chassis certificate may be created by large enterprises, such as a TELCOs at their procurement site. The chassis certificate includes information regarding the number of chassis slots, type of each line card, its vendor, model name, manufacturing location, expiration date, certificate-id and other information, and is signed by the company that is creating the certificate. Additionally, a software module, termed, "Chassis Configuration Tracking Module (CCTM)", is disposed in the chassis controller and communicates with other computing elements on the linecards, daughter cards and other components that use PKI or other authentication methods over IPMI, Backplane Ethernet or other inter-card communication methods. After trust verification of the chassis modules, the CCTM saves the chassis configuration, and verifies the configuration is unchanged after every power-up.

When a chassis in the path of a Secure Network Slice functions as a packet forwarding device or path terminating device that provides application services or functions as an edge cache or application proxy or gateway in SDN/NFV/Cloud environments, the CCTM assists the DTB in assuring the chassis configuration, hardware, software modules are same as when they were previously verified.

Figure 9:
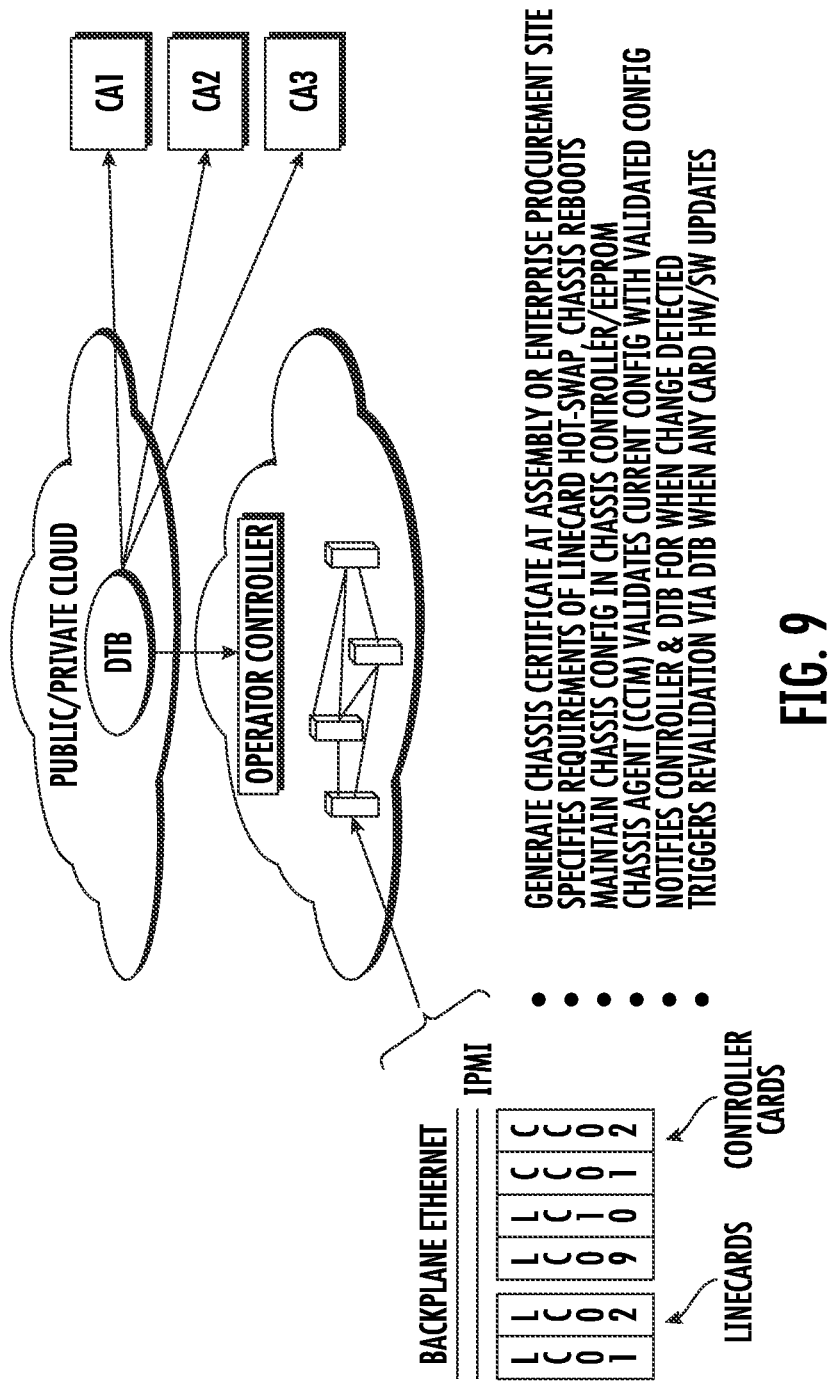
FIG. 9 shows an example of a chassis network element with multiple line cards and controller cards that communicate internally through a backplane ethernet or IPMI for control and management operations.

In FIG. 9, the two controller cards serve for redundancy and protection against controller card failures. The line cards and controller cards may be manufactured or rebranded by different vendors and may have their own TPMs and Digital Certificates. The chassis certificate identified herein may be generated at an assembly/reseller location, or at enterprise procurement location. While the chassis is shown as an integrated box, in other embodiments, several modular units interconnected with external cables within a cabinet or interconnected and managed as a unit is also applicable.

While the above describes a chassis based device having line cards, it is understood that the concept of a Chassis Certificate applies to any network device that comprises a plurality of components, which may be hardware or software components.

Bridging Between User Authentication (OATH2) and Device Authentication (PKI)

Different users (clients, employees, developers, IT, Customer Service and others) require different level of access Authentication and Authorization to determine access-policies and security control to protect service, server, applications, and shared data. Similarly, when a developer with high privileges initiates a session through a multi-domain transit network, this session traffic needs to be protected in the client device, in transit and server; thus requiring different level of trust/security. X.509/PKI digital certificates provide trust assurance mechanism from globally visible PKI infrastructure components, such as CA, Root CA, and OCSP Server that assist in tracking and validating expired or revoked certificates. An enterprise or a communication service provider may use other authentication and authorization mechanisms in their domain of control and serviced offerings. For example, mobile wireless service providers use SIM or eSIM to validate user accounts, RADIUS and OAUTH2 authentication methods, MFA methods to validate users, user account policy servers to maintain and validate user access policies. The DTB orchestrates the bridging between the user access level authentication and network/system authentication mechanisms such as device authentication of devices that use X.509 certificates with metadata extensions or EPID methods.

Data Dependent Authorization Levels

A system that holds and manages secure and confidential information or executes a plurality of applications may require different authorization levels that are dependent on type of data, and type of operations (for example, read, write, delete, modify, copy). Each authorization level may use different authentication mechanisms (OAUTH2, multi-part authentication, fingerprint, facial recognition, passwords), and each level may require different security and trust assurance of a plurality of virtual and physical devices while accessing the distributed system. By bridging the user authentication level to the required device trust levels per certificate metadata, and detecting trust violations, the DTB generates triggers and orchestrates recovery actions. If the system holds different types of data for different departments, different users (customers, employees, developers etc.), the required authorization/authentication levels for read/write/modify may not be known when the user initiated the connection and known only after the specific data segments being accessed are known. In this scenario, the system triggers re-authorization through the DTB.

Multi-Layer Trust Validation in a Device

SDN/NFV environments that execute multiple tenant applications on COTS hardware use multiple software entities such as client OS, Hypervisor, Virtual Machine (VM), container, and application, and layers of networking such as dark-fiber, MPLS, ethernet, VLANS, IP in IP, GRE/GTP-U, VXLAN tunnels and others. Such layered entities may be from a plurality of vendors, and/or from a plurality of regions/countries. When an application receives or processes highly sensitive data, it is essential that each layer is trust assured since one of the layers below could copy or alter the content or maliciously present user credentials. The DTB interacts with control and management systems of the service providers in the transit network, verifies trust of each layer up to the physical layer and generates a stapled certificate that reflects the validation of the underlying layers. It associates the certificate at the top layer that is targeted to execute the high security application for fast authentication without requiring authenticating each layer below when secure application use is initiated. Also, the top-level certificate should facilitate tracking and validation of lower layers, so that if the lower layer authentication expires or is revoked, or the software updated, this event will be visible at the top layer for triggering revalidation. Additionally, an agent application that executes in the virtual device may assist the DTB in validating the trust.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of incorporating security, trust and other policy requirements that include provenance and other metadata policy attributes for a network that includes a plurality of physical and virtual network functions (VNFs) that offer a service, the method comprising:
    embedding required policy attributes in an enhanced digital certificate (eDC) in one or more VNF; and
    using the eDC to validate before, during and after use of the service;
    wherein the VNFs include physical or virtual elements that process, store, or transport data in virtual or physical network environments, wherein the virtual or physical network environments are enterprise data centers, Software Defined Networks, public/private/hybrid Clouds, Wireless operator networks and/or Wireline operator networks.

2. The method of claim 1, wherein the service comprises an end-to-end secure network slice (SNS) through a multi-domain, multi-operator network; wherein the policy attributes dictate the provenance data, other policy and configuration data for each type of network element and the types of functions performed by the network element, wherein the eDC is referred to as a slice certificate, and wherein the slice certificate determines the policy attributes.

3. The method of claim 2, wherein the metadata for the virtual network function includes provenance data, geolocation for each type of device/function and configurable features that each network element (NE) involved in providing the service or network slice required to support and the configuration attributes of the device feature while in operation.

4. The method of claim 2, wherein the slice certificate is incorporated in end points that terminate the SNS.

5. The method of claim 2, wherein the SNS is constructed by joining multiple secure network slices where each secure network slice includes a slice certificate that corresponds to a segment of the SNS in each transit operator or service provider network.

6. The method of claim 1, wherein the service corresponds to a physical or virtual distributed function, wherein the function is a database service, an application service, a proxy service, or a network service, that interconnects two different networks with different security domains, and the eDC is referred to as a service certificate and wherein the service certificate is used to orchestrate the service.

7. The method of claim 6, wherein the service that the service certificate orchestrates corresponds to a virtual network function that is implemented over a distributed system and is incorporated in the virtual/physical nodes that offer the service to clients or manage the service.

8. The method of claim 6, wherein a Digital Trust Broker interacts with a plurality of management platforms in service provider networks to assure security and trust policies orchestrated by the service certificate, at a granularity of resources and frequency according to policies defined by the service certificate.

9. The method of claim 1, the service comprises multiple classes of security levels, where each security level orchestrates policy attributes for the specific security level.

10. The method of claim 1, wherein the policy attributes include authorization for types of accesses while using the service, and/or provenance and metadata attributes for transit physical/virtual network elements that offer the service.

11. A method of facilitating supply chain tracking of a device for high security and trust assurance from manufacturing location to a service provider or enterprise procurement locations, the method comprising:
    creating an enhanced Digital Certificate (eDC) for the device, wherein the eDC contains supply chain data;
    incorporating additional human and/or machine-readable identifiers which are readable while the device is powered off; and
    using the supply chain data in the eDC to validate and assure that the device only traversed through trusted vendors, trusted locations and trusted regions before, during and/or after the device is used in processing highly sensitive data.

12. The method of claim 11, wherein the additional human and/or machine-readable identifiers comprises a Manufacturing Vendor name, a Vendor location, a Model Name, a Model Number, a MAC address, a bar code, a QR Code, and/or a RFID tag.

13. The method of claim 11, further comprising: interacting with a plurality of vendor systems involved in the device shipment from manufacturing location to the service provider or enterprise procurement locations.

14. The method of claim 11, wherein the supply chain data is onboarded as allowed transit paths into the enhanced digital certificate so that the eDC serves to orchestrate allowed transit vendors and their locations.

15. The method of claim 11, further comprising: using a Digital Trust Broker (DTB) that bridges trust between multiple authorization and authentication systems for validating supply chain attributes.

* * * * *